United States Patent
Hertzberg et al.

(10) Patent No.: US 12,039,402 B2
(45) Date of Patent: Jul. 16, 2024

(54) COLOR-MAP METHOD TO ELIMINATE QUBIT FREQUENCY CROWDING IN A QUANTUM COMPUTING CHIP

(71) Applicant: INTERNATIONAL BUSINESS MACHINES CORPORATION, Armonk, NY (US)

(72) Inventors: Jared Barney Hertzberg, Yorktown Heights, NY (US); Alan E. Rosenbluth, Yorktown Heights, NY (US); Dongbing Shao, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1001 days.

(21) Appl. No.: 16/998,851

(22) Filed: Aug. 20, 2020

(65) Prior Publication Data

US 2022/0058509 A1 Feb. 24, 2022

(51) Int. Cl.
*G06N 10/00* (2022.01)
(52) U.S. Cl.
CPC .................. *G06N 10/00* (2019.01)
(58) Field of Classification Search
CPC ................................ G06N 10/00–80
See application file for complete search history.

(56) References Cited

U.S. PATENT DOCUMENTS

| 9,379,303 B2 | 6/2016 | Gambetta et al. |
| 10,140,404 B2 | 11/2018 | Rigetti et al. |
| 10,192,168 B2 | 1/2019 | Rigetti et al. |

(Continued)

FOREIGN PATENT DOCUMENTS

WO 2015178992 A2 11/2015

OTHER PUBLICATIONS

Ding, Yongshan, et al. "Systematic Crosstalk Mitigation for Superconducting Qubits via Frequency-Aware Compilation." arXiv preprint arXiv:2008.09503 (2020). (Year: 2020).*

(Continued)

*Primary Examiner* — Markus A. Vasquez
(74) *Attorney, Agent, or Firm* — Amin, Turocy & Watson, LLP

(57) ABSTRACT

A method of frequency allocation in a quantum device having a plurality of qubits includes determining a plurality of frequency groups based on a configuration of the plurality of qubits; determining, for each of the plurality of qubits, a qubit frequency; assigning a frequency group from the plurality of frequency groups to each of the plurality of qubits based on each respective qubit frequency; determining for at least one qubit of the plurality of qubits whether a frequency collision exists between the at least one qubit and neighboring qubits in the plurality of qubits based on the qubit frequency of the at least one qubit and at least one qubit frequency of the neighboring qubits; and adjusting the frequency of the at least one qubit based on the determination whether a frequency collision exists between the at least one qubit and said neighboring qubits in the plurality of qubits. A non-transitory computer-readable medium for frequency allocation in a quantum device includes instructions to perform the method.

20 Claims, 13 Drawing Sheets

(56) References Cited

U.S. PATENT DOCUMENTS

| | | |
|---|---|---|
| 10,423,888 B1 | 9/2019 | Hertzberg et al. |
| 2018/0330267 A1 | 11/2018 | Rigetti et al. |
| 2019/0007051 A1* | 1/2019 | Sete .................. G06N 10/00 |
| 2019/0042968 A1 | 2/2019 | Lampert et al. |
| 2019/0044668 A1 | 2/2019 | Elsherbini et al. |
| 2019/0156236 A1* | 5/2019 | Bishop ................ H03K 3/013 |
| 2019/0296211 A1 | 9/2019 | Chow et al. |
| 2021/0036206 A1* | 2/2021 | Neill ................ H10N 60/805 |

OTHER PUBLICATIONS

Brink, Markus, et al. "Device challenges for near term superconducting quantum processors: frequency collisions." 2018 IEEE International Electron Devices Meeting (IEDM). IEEE, 2018. (Year: 2018).*
Li et al., "Towards Efficient Superconducting Quantum Processor Architecture Design", arXiv:1911.12879v1 [quant-ph] Nov. 28, 2019.

* cited by examiner

| Qubit | Anneal Targets | Example Init. Freq. | Anneal Distance |
|---|---|---|---|
| 0 | 5.083380 | 5.350194 | 0.266814 |
| 1 | 4.930303 | 5.242372 | 0.312069 |
| 2 | 5.049132 | 5.062025 | 0.012893 |
| 3 | 4.990132 | 5.212717 | 0.222585 |
| 4 | 5.141792 | 5.276603 | 0.134811 |
| 5 | 5.201977 | 5.231769 | 0.029792 |
| 6 | 4.929792 | 5.224951 | 0.295159 |
| 7 | 5.141792 | 5.213188 | 0.071396 |
| 8 | 5.082792 | 5.299948 | 0.217155 |
| 9 | 5.142977 | 5.291562 | 0.148585 |
| 10 | 5.141420 | 5.266903 | 0.125483 |
| 11 | 5.141792 | 5.301877 | 0.160084 |
| 12 | 5.201977 | 5.207386 | 0.005409 |
| 13 | 5.082420 | 5.329078 | 0.246658 |
| 14 | 5.023792 | 5.279712 | 0.255920 |
| 15 | 5.142374 | 5.259050 | 0.116676 |
| 16 | 5.083374 | 5.354913 | 0.271539 |
| 17 | 5.141420 | 5.414936 | 0.273516 |
| 18 | 5.141792 | 5.164777 | 0.022985 |
| 19 | 5.201925 | 5.239163 | 0.037238 |
| 20 | 5.023420 | 5.328278 | 0.304858 |
| 21 | 5.141792 | 5.360538 | 0.218746 |
| 22 | 5.082792 | 5.396856 | 0.314064 |
| 23 | 5.142925 | 5.302529 | 0.159604 |
| 24 | 5.141792 | 5.164472 | 0.022680 |
| 25 | 5.201925 | 5.318642 | 0.116717 |
| 26 | 4.930487 | 5.157728 | 0.227241 |
| 27 | 5.142380 | 5.319797 | 0.177416 |

All values are frequencies in GHz.

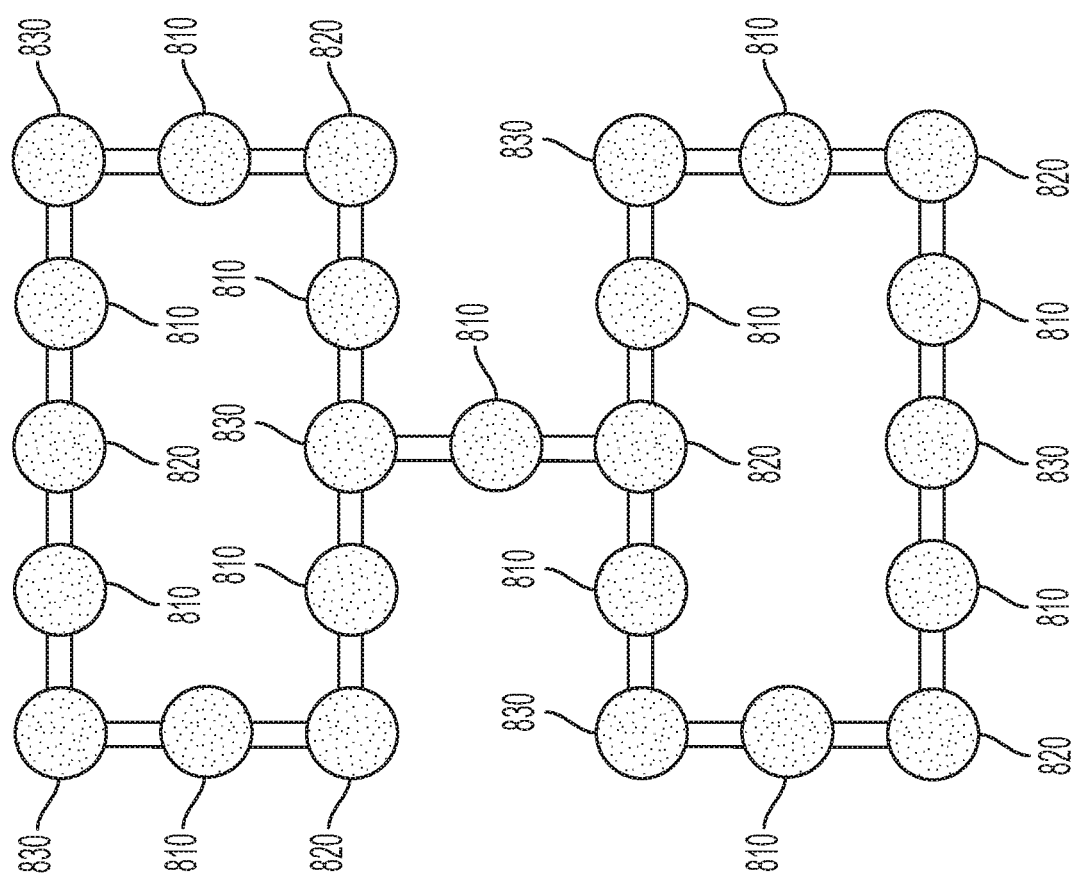

COLOR-MAP METHOD TO ELIMINATE QUBIT FREQUENCY CROWDING IN A QUANTUM COMPUTING CHIP

BACKGROUND

The currently claimed embodiments of the present invention relate to a qubit frequency coloring method, and corresponding computer-readable medium, and a quantum computing device having a plurality of frequency colored qubits.

Quantum computers often include quantum bits (qubits) formed as part of a quantum qubit chip (quantum device). Each qubit has a resonant frequency at which it operates. Nearby qubits, such as nearest neighbor qubits, or sometimes next nearest neighbor qubits, can have a frequency collision with their neighbors if their resonant frequencies are close to each other, or more generally if the driving signals that are used to excite the resonant frequency of one qubit can also excite an unwanted transition in a qubit that neighbors the driven qubit. In principle, qubit frequency collisions can be avoided by assigning a frequency "color", i.e., a frequency range, for each qubit to operate therein. Each color has a different resonant frequency or frequency range. The same color corresponds to the same frequency range. It is not easy, however, to assign a different color for each qubit due to limitations on frequency tuning of the qubits, and frequency collision restrictions. Each color can be a range of frequencies, where the different colors are assigned to qubits to avoid frequency collisions. More generally, each color can consist of a group of frequencies that may share a similar set of potential frequency collisions, and these potential collisions may be analyzed in terms of the mean frequency of the group of frequencies, which may also be the center frequency of a range of frequencies that corresponds to the color.

The resonant frequency of a manufactured qubit will naturally vary due to drifts and nonuniformities in junction fabrication processes. This variation due to the manufacturing can be difficult to control. The random variation of qubit frequency makes each qubit chip unique. Adjusting the qubit frequency of each qubit to yield a collision free quantum computing chip can be a difficult task, and may depend on the number of qubits, the qubit connectivity, and possibly the frequency of second nearest neighboring qubits. As a result, the problem remains to create a quantum chip with reduced or minimized frequency collisions between adjacent qubits in the quantum chip. As a result, it is desirable to provide a frequency tuning plan for each manufactured chip. Since manufacturing errors may prevent the frequencies specified by the tuning plan from being exactly realized, these specified frequencies may be referred to as target frequencies.

SUMMARY

An aspect of the presently claimed invention is to a method of frequency allocation in a quantum device having a plurality of qubits. The method includes determining a plurality of frequency groups based on a configuration of the plurality of qubits, wherein each frequency group of the plurality of frequency groups has a range of frequencies; determining, for each of the plurality of qubits, a qubit frequency; assigning a frequency group from the plurality of frequency groups to each of the plurality of qubits based on each respective qubit frequency; determining for at least one qubit of the plurality of qubits whether a frequency collision exists between the at least one qubit and neighboring qubits in the plurality of qubits based on the qubit frequency of the at least one qubit and at least one qubit frequency of the neighboring qubits; and adjusting the frequency of the at least one qubit based on the determination whether a frequency collision exists between the at least one qubit and the neighboring qubits in the plurality of qubits.

Another aspect of the presently claimed invention is to provide a non-transitory computer-readable medium for frequency allocation in a quantum device having a plurality of qubits. The computer-readable medium includes instructions, that when executed by a computer system, cause the computer system to determine a plurality of frequency groups based on a configuration of the plurality of qubits, wherein each frequency group of the plurality of frequency groups has a range of frequencies; determine, for each of the plurality of qubits, a qubit frequency; assign a frequency group from the plurality of frequency groups to each of the plurality of qubits based on each respective qubit frequency; determine for at least one qubit of the plurality of qubits whether a frequency collision exists between said at least one qubit and neighboring qubits in the plurality of qubits based on the qubit frequency of said at least one qubit and at least one qubit frequency of the neighboring qubits; and adjust the frequency of the at least one qubit based on the determination whether a frequency collision exists between said at least one qubit and neighboring qubits in the plurality of qubit.

BRIEF DESCRIPTION OF THE DRAWINGS

Some embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

FIG. 12 illustrates another lattice of qubits, according to some embodiments of the present invention.

DETAILED DESCRIPTION

Some embodiments of the current invention provide an approach to finding the frequency tuning plan for any chip, using methods from graph theory in mathematics, specifically the 'graph coloring problem' or 'map coloring problem'. In the graph coloring problem, colors must be assigned to vertices in a graph, subject to constraints on the color of nearby vertices. According to some embodiments of the current invention we assign a frequency 'color' to each qubit subject to constraints regarding the initial frequency of the qubit, the frequencies of its neighbors, and the methods available to tune the qubit.

According to some embodiments, a method of frequency allocation of qubits in a quantum computing device is provided. According to some embodiments of a quantum chip structure with a qubit arrangement and connectivity, a locally maximized margin between collision frequencies and colors, i.e., resonant frequencies, is provided, and further a global optimization to provide an overall margin maximization is provided. In some embodiments the margin that is maximized is a reserve or so-called extra margin that is introduced above and beyond a minimum margin (where a minimum margin may also be described as a collision tolerance band, or as a band of frequencies surrounding the exact collision frequency), where the minimum margin extends sufficiently far from the exact collision frequency that it prevents the finite bandwidth of the driving signals from causing a collision. Note that the term "extra margin" could also be referred to as a safety margin or slack margin or yield-enhancing margin that guards against manufacturing error.

Figure 1:
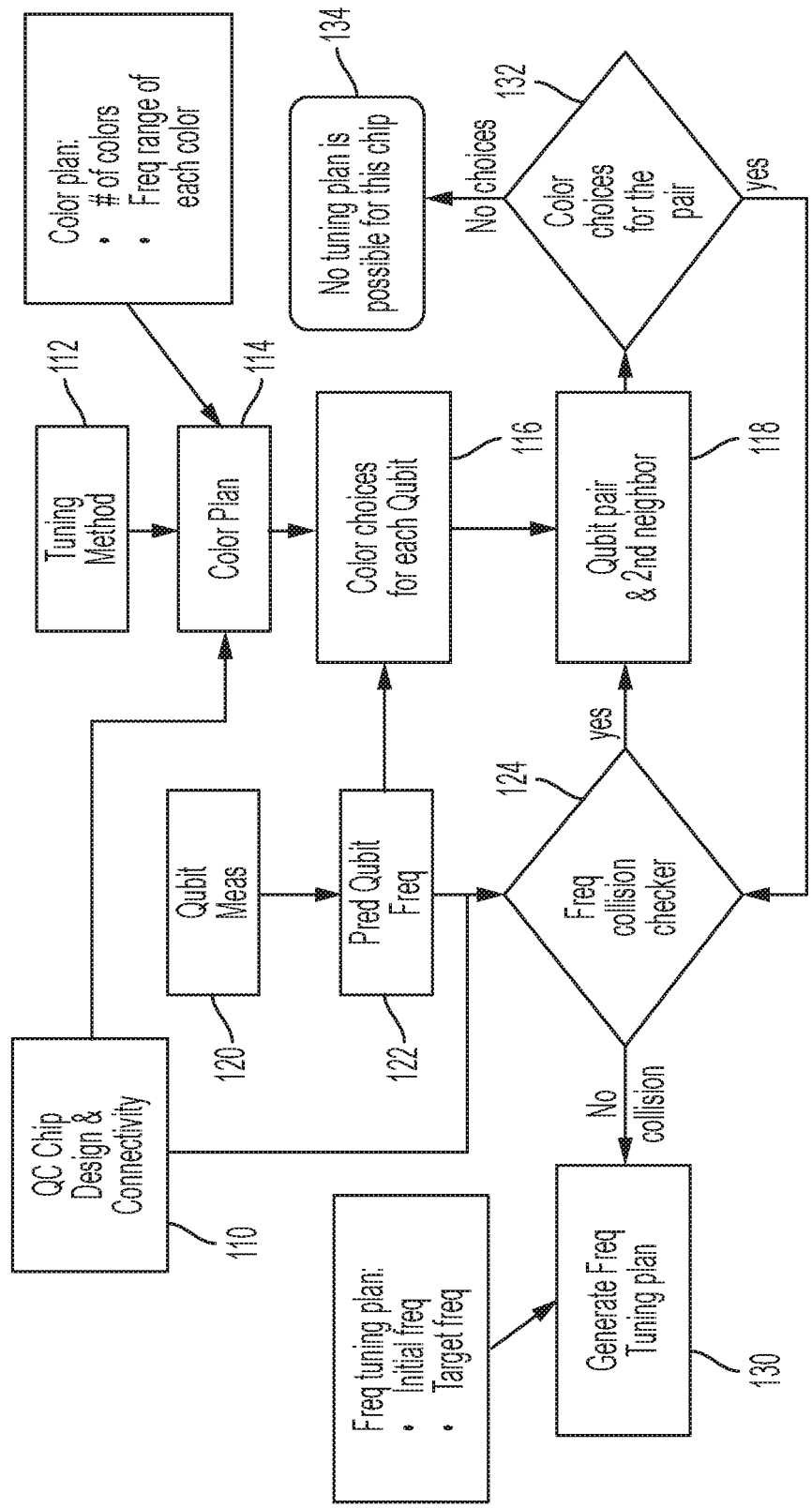
FIG. 1 is a flow chart illustrating a method of allocating qubit frequencies, according to some embodiments of the present invention.

FIG. 1 is a schematic of a flow chart of a general approach to frequency allocation. In FIG. 1, "freq" is used to abbreviate "frequency", "meas" to abbreviate "measurement" and "pred" to abbreviate "prediction". The flow chart of FIG. 1 is for a structure which includes qubit pairs and second nearest neighbor qubits near the pair. The approach is independent of the frequency adjustment method, and independent of the specific arrangement of the qubit chip lattice, which determines the location and connectivity of the qubits. The approach assesses the frequencies of the qubits following device fabrication, and adjusts for any technological limitations on the frequency adjustments that can be made. From these inputs, the approach determines whether a collision-free frequency arrangement may be reliably achieved in this chip despite these limitations, or instead whether collisions cannot be avoided given the limitations on available frequency adjustments. Note that it is usually the presence of limitations on the range of attainable qubit frequencies that may make collisions impossible to avoid, and that some embodiments of the invention determine whether these adjustment limitations are indeed severe enough to prevent collisions from being entirely avoided. Such limitations on the extent to which qubit frequencies can be adjusted are present in technologies of interest in quantum computing. In step 110, a quantum computing chip design and qubit connectivity is provided. The design provides for a location and connectivity between qubits.

In step 112, the qubit tuning method is set. The tuning method will perform a measurement of the resonant frequency of the qubit and determine the frequency adjustment possible, i.e., the amount that the frequency may be adjusted, and whether the adjustment may increase and/or decrease the qubit resonant frequency. Once the tuning method is set in step 112 and a quantum computing chip design and qubit connectivity is provided in step 110, a color plan is set, at step 114. The color plan includes determining the number of colors and the frequency range for each color. In step 116, color choices for each qubit are provided. In step 118, the qubits are assigned a color based on their connectivity, where connectivity may include pairwise connections, i.e. qubit pairs, and may include second nearest neighbors, i.e. qubit triplets. In step 132, it is determined whether there are color choices available for each qubit pair to avoid frequency collisions.

In step 120, at least one parameter of each qubit is measured. Flow proceeds to step 122, where based on the at least one parameter measured in step 120, the resonant frequency of each qubit is determined.

In step 124, after determining the resonant frequency or color of each qubit, it is checked whether any collisions between qubits occur based on the predicted qubit frequency for each qubit in step 122, and the design and connectivity from step 110. If there are no collisions for any of the qubits, a frequency tuning plan is generated in step 130. The frequency tuning plan at step 130 provides a color assignment for each of the qubits, and the amount of tuning needed for each qubit to have a resonant frequency which falls within the frequency range of the assigned color. If there are collisions for any of the qubits, the process flow goes to step 118 for another color assignment, considering nearest neighbors, i.e. qubit pairs, and second nearest neighbors, i.e. qubit triplets.

In step 132, it is determined whether there are color choices for each qubit, considering connected qubit pairs and connected qubit triplets. If not, the process proceeds to step 134 where it is determined that the quantum computing chip cannot be tuned into a collision-free configuration using available tuning methods. If there are color choices for the qubits, process flows to step 124 where it is checked whether any collisions between qubits occur.

The method of FIG. 1 provides a simple general approach to assigning colors to qubits with the benefit that this approach can be a universal method, but it provides rigid color choices which are more restrictive than is required for collision avoidance, especially qubit arrangements such as heavy hexagon chip arrangements. As a result, in some cases, the likelihood of producing a collision-free chip may be low. Moreover, the rigid coloring may be more restrictive than is needed.

A given qubit need only meet requirements that are purely local in order to fulfill its role, e.g. a control qubit or a target qubit. For example, for a quantum computing device with transmon qubits, it suffices for a transmon control qubit to simply have a higher $f_{01}$ frequency (frequency for a transition from state 0 to state 1) than the immediate neighbors which it drives, assuming that the frequency collisions are also avoided.

According to some embodiments, there is provided a method which provides for assignment of colors to qubits, and locally maximizes a margin between frequencies of the assigned colors and collision frequencies, and in some embodiments further provides a global optimization to provide an overall margin maximization. Note that the maximized quantity is a margin between color frequencies (or qubit frequencies) and collision frequencies. More particularly, in some embodiments it is the smallest such margin that is maximized. As will be clear to those skilled in the art, the specific frequencies whose separation forms the smallest margin (i.e. the specific qubit or the specific collision degeneracy whose frequencies are separated by the margin that is smallest, or both the specific qubit and the specific collision degeneracy) can change as a working set of frequencies is iterated during a search for the optimal set of target qubit frequencies, so that in some embodiments the qubit and collision frequencies whose separation is being maximized will change during the course of the iterations. In these embodiments the invention nonetheless iterates the working set of target frequencies until whichever margin ends up being smallest has been made as large as possible. These iterations will often have the effect of modestly decreasing those margins that remain considerably larger than the smallest margin, if this allows improvement in the smallest margin.

Figure 2:
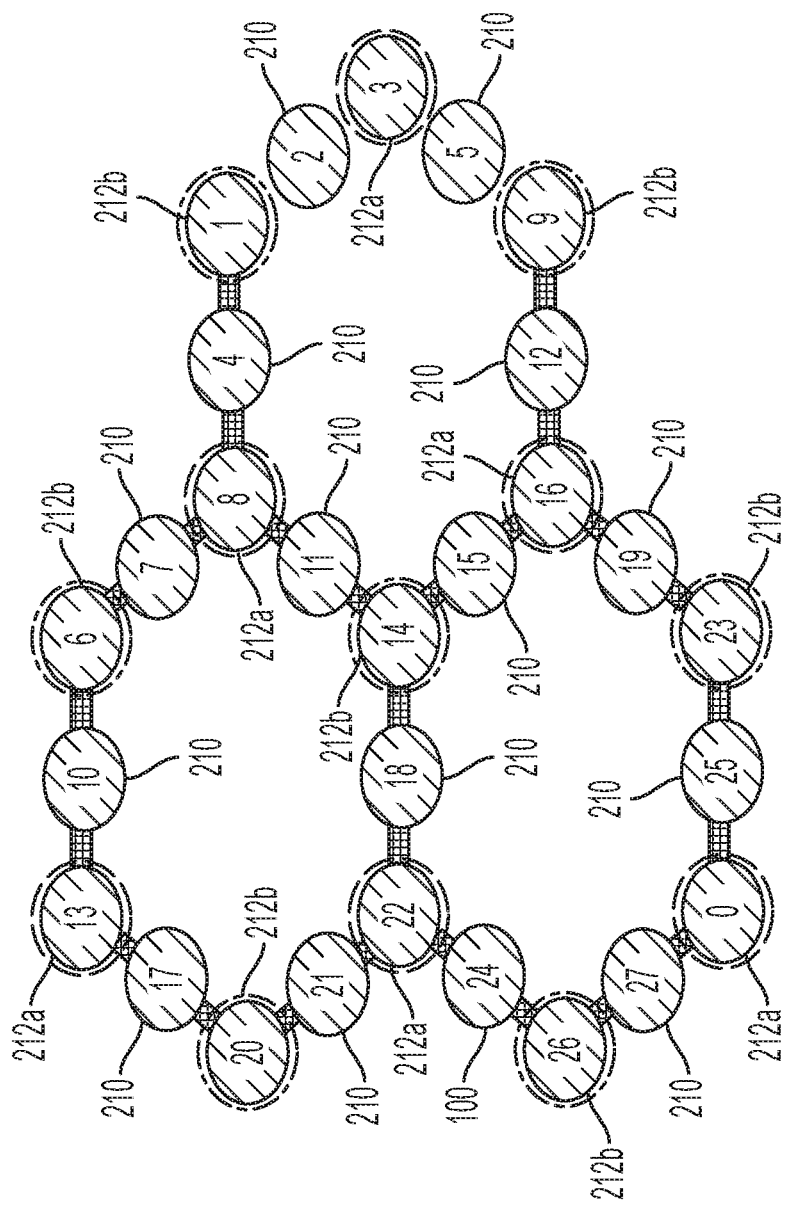
FIG. 2 is a schematic illustrating a heavy hexagon arrangement and connectivity of qubits as illustration of a structure for locally maximizing a margin, and further providing a global optimization to provide an overall margin maximization, according to some embodiments of the present invention.

FIG. 2 illustrates a heavy hexagon arrangement 200 and connectivity of qubits as illustration of a structure for locally maximizing margins, and further providing a global optimization to provide an overall margin maximization, according to an embodiment of the present invention. The heavy hexagon arrangement includes qubits 210, 212a and 212b. Each pair of target qubits 212a and 212b, is separated by a control qubit 210.

In certain embodiments there are four distinct frequency combinations which allow the collision-avoidance margin to be maximized within each triplet of qubits, where the triplet of qubits includes the pair of target qubits 212a and 212b, separated by a control qubit 210. Each combination of frequencies specifies optimal differences in frequency between the control qubits 210 and the two target qubits 212a and 212b of the triplet. In this optimization, the mean frequency is a free parameter.

Each solution maximizes margins locally. When the frequencies are set to any one of these solutions, it is found that three different collisions (in fact three different kinds of collisions) are binding at the worst-case margin values. An attempt to further improve one of these binding margins causes other of the margins to degrade further. The solutions depend on predefined collision tolerances. The optimized margins provide extra padding to separate the central frequency in the frequency bands of the different colors from collision bands. The best of these solutions is the global optimum.

Four distinct frequency combinations allow the collision-avoidance margin to be maximized. To be precise, each of these four solutions specifies optimal differences in frequency between the control set of qubits 210 and each of the two classes of target qubits 212a and 212b.

Table 1 shows examples of four distinct frequency combinations, numbered 1 through 4, each with a respective frequency margin being the worst extra margin, where the worst extra margin is the extra margin that is smallest. Table 1 illustrates the difference between frequency of the control qubit, $f_{Control}$, and target qubit, $f_{Target, 1}$, or $f_{Target, 2}$, for each frequency combination as well as the type of binding collision margin from FIG. 7. In this example the frequency combination in the first row provides a globally optimal maximization of the worst extra margin.

TABLE 1

| # | Worst Extra Margin | $f_{Control}$ - $f_{Target, 1}$ | $f_{Control}$ - $f_{Target, 2}$ | Binding Collision Margins | | |
|---|---|---|---|---|---|---|
| 1 | 44.0 | 61.0 | 122.0 | Type1 | Type2 | Type5 |
| 2 | 39.7 | 213.7 | 270.3 | Type2 | Type3 | Type5 |
| 3 | 33.0 | 50.0 | 207.0 | Type1 | Type2 | Type7 |
| 4 | 29.8 | 280.3 | 136.3 | Type2 | Type3 | Type7 |

All frequencies in MHz

Figure 3:
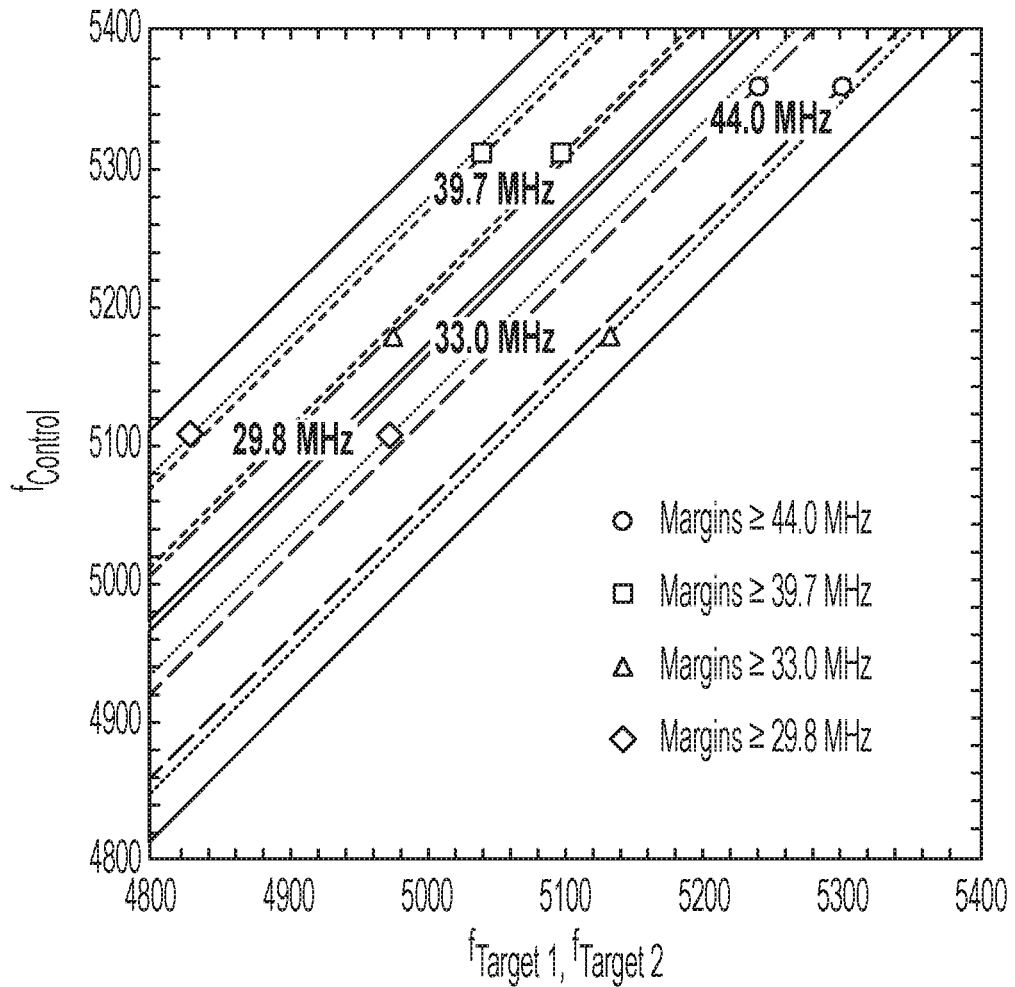
FIG. 3 is a graph illustrating the margins for each frequency combination according to some embodiments of the present invention.

FIG. 3 illustrates the margins for each frequency combination, where the frequency of the control qubit, $f_{Control}$, is shown as a function of target qubit, $f_{Target, 1}$, and $f_{Target, 2}$, according to an embodiment of the present invention. In the example of FIG. 3, the margins for the frequency combination 1, frequency combination 2, frequency combination 3, and frequency combination 4, were found to be respectively, 44.0 MHz, 39.7 MHz, 33.0 MHz, and 29.8 MHz. The first solution provides an optimal overall margin from among all the frequency combinations, while frequency combinations 2, 3, and 4 provide locally optimal solutions.

Figure 4A:
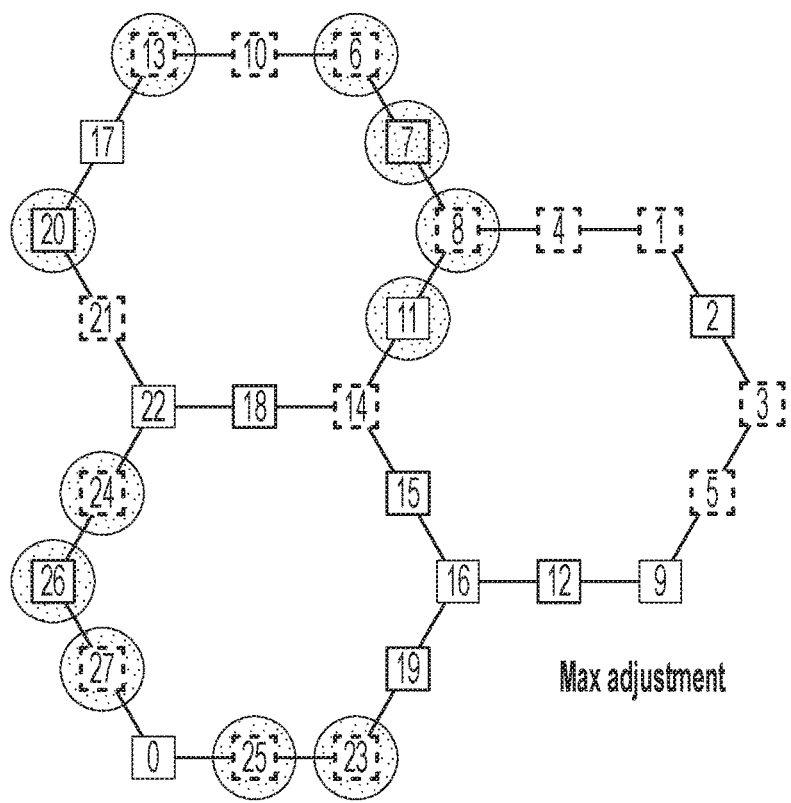
FIG. 4A illustrates a heavy hexagon arrangement of qubits before tuning, according to some embodiments of the present invention.
Figure 4B:
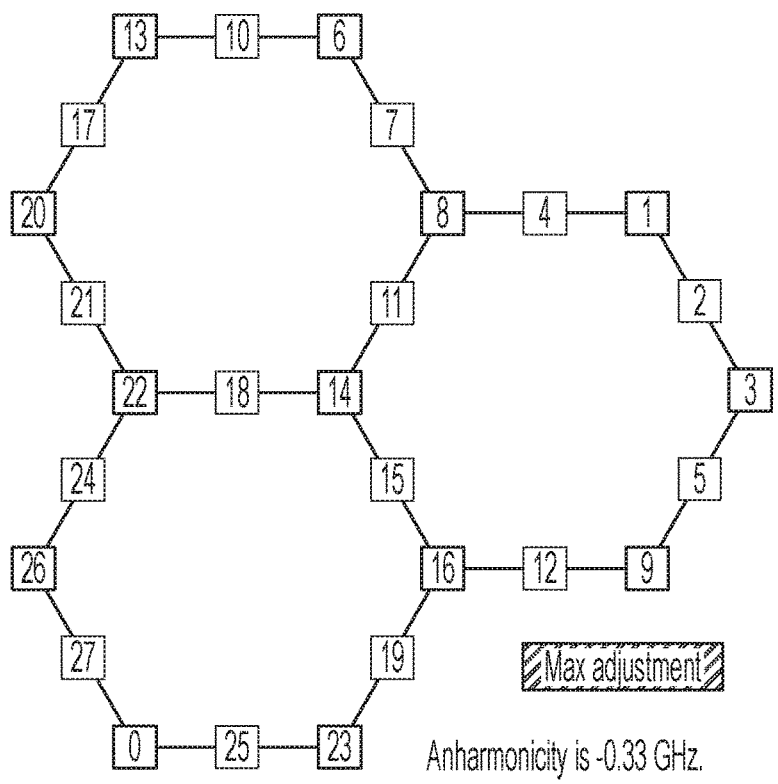
FIG. 4B illustrates the heavy hexagon arrangement of qubits of FIG. 4A after tuning, according to some embodiments of the present invention.

FIG. 4A illustrates a heavy hexagon arrangement of qubits before tuning, according to an embodiment of the present invention. FIG. 4B illustrates a heavy hexagon arrangement of qubits after tuning, according to an embodiment of the present invention. The qubits in FIG. 4A, as well as in FIG. 4B, are numbered 0 through 27 to identify the qubits. In FIGS. 4A and 4B, the initial (before tuning) qubit resonant frequencies are shown, and the tuned frequencies (Anneal Targets) are also listed for each of the qubits 0 through 27.

The qubits include control qubits 210 between pairs of target qubits 212a and 212b in a similar fashion to the heavy hexagon arrangement of qubits of FIG. 2. Qubits which fail to fulfil a proper control or target role due to their resonant frequency are shown in dashed lines in FIG. 4A. These qubits have higher frequencies than some of their neighbors, and lower frequencies than other of their neighbors. Qubits involved in collisions are circled.

In FIG. 4B, qubits with a higher frequency than each of their neighbors are indicated by lighter-line boundaries. Heavy-line boundaries indicate qubits with a lower frequency than each of their neighbors. The light-line qubits correspond to the control qubits 210. The heavy-line qubits correspond to the target qubits 212a and 212b. The structure of FIG. 4B has been tuned such that none of the qubits has a frequency collision with any of the qubit's neighbors. For the case of FIG. 4B, the margins exceed predefined collision tolerances by at least 40 MHz, for example. Note that qubit connections in FIG. 4B are also indicated by solid lines.

Generally, the more colors that are needed to achieve no frequency collisions, the higher the tuning precision that is needed, and the narrower the frequency range that constitutes the colors. Some quantum computing chips may need more colors in order to yield a proper chip depending on the resonant qubit frequency and the connectivity between chips.

Further, generally during the coloring process, in order to avoid introducing new frequency collisions, one may assign a color starting with qubits that have fewer neighbors. One may also assign a color starting with qubits having more color choices (i.e., available color selections). The assignment of colors to qubits may in certain embodiments be expressed in terms of a graph coloring problem. The graph coloring problem is to assign colors to certain elements of a graph subject to certain constraints. Vertex coloring is the most common graph coloring problem. Therefore, the problem is, given n colors, finding a way of coloring the vertices of a graph such that connected vertices do not have the same color. A goal is to find the chromatic number. The chromatic number corresponds to the smallest or minimum number of colors needed to color a graph G. For example, for some lattices of interest in quantum computing, the graph representing the connections between the qubits has a chromatic number of 2. In such a graph each vertex represents a qubit in the lattice, while each graph edge represents a connection. To avoid unwanted interactions between neighboring qubits it is necessary that directly connected qubits have different frequencies, or in other words that each vertex in the lattice graph be assigned a different color from its immediate neighbors, meaning that at least two colors must be used if the graph has a chromatic number of 2. However, in such cases two colors may not suffice to prevent collisions, for a number of possible reasons. For example, collisions between neighboring qubits can arise even when the qubits have different frequencies, as may be seen, for example, from the equations for so-called Type 2 or Type 3 collisions (i.e. equations 2 and 3 in Table 2). In addition, collisions can arise from next-nearest neighbors, meaning that different colors may need to be assigned to next-nearest neighbors in the graph. Moreover, even though it may prove possible to make a collision-free coloring using some limited number of colors if one were to assume an ideal tuning capability, it can often be the case with real chips that none of the possible color assignments (from among the limited number of colors) is actually usable for certain of the qubits, due to limitations on the tuning range that is available for those qubits. Thus, in some embodiments of the invention three colors are preferable even when the lattice graph has a chromatic number of 2, and more generally it may be necessary to choose a larger number of colors than the chromatic number of the lattice graph.

Figure 5:
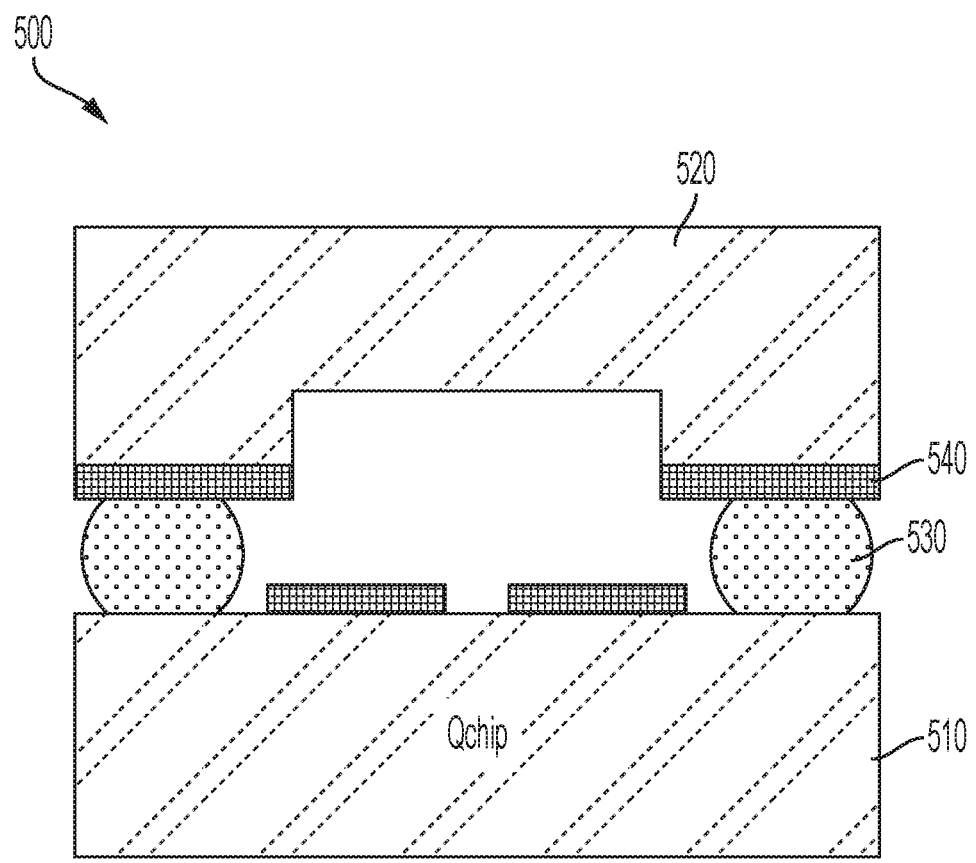
FIG. 5 illustrates a flip-chip structure used to tune the frequency of a qubit on a qubit chip according to some embodiments of the present invention.

FIG. 5 illustrates a flip-chip structure 500 used for some embodiments to tune the frequency of a qubit on a qubit chip 510 connected to an interposer chip 520 via bump bonds 530, according to some embodiments of the present invention. The interposer chip 520 includes a ground plane 540, of metal, which may be varied in its design to tune the resonant frequency of the underlying qubit on the qubit chip 510. The change in capacitance and thus change in the resonant frequency are due to the ground plane 540 structure, and the distance between the qubit chip 510 and the interposer chip 520.

Figure 6:
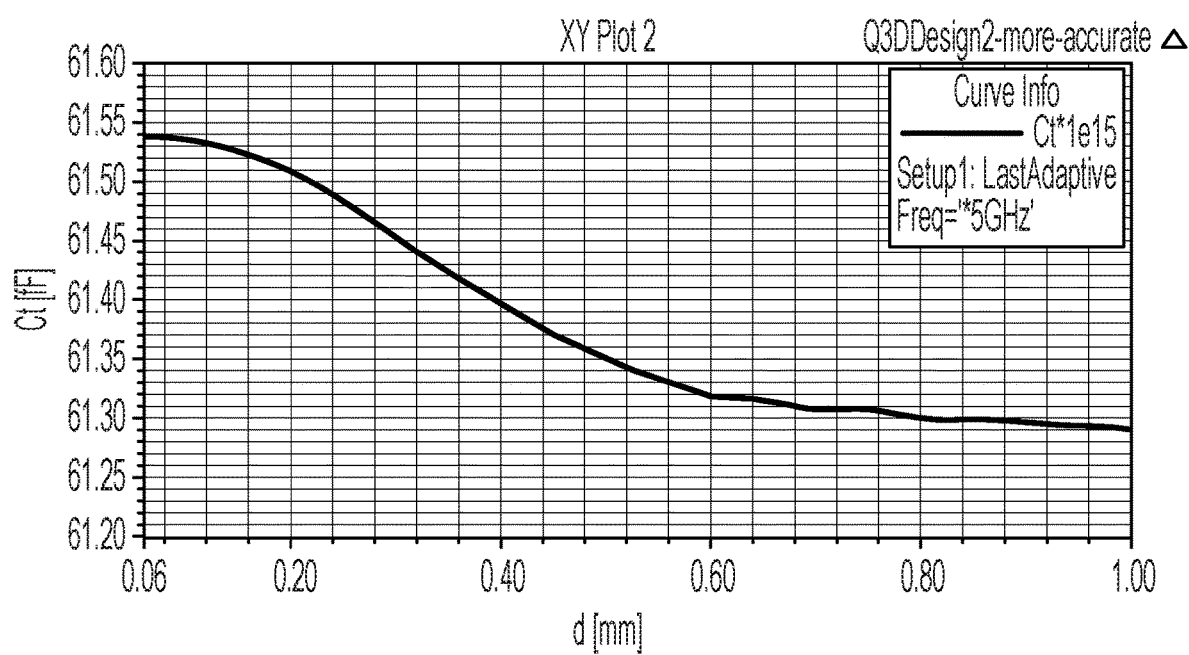
FIG. 6 is a graph illustrating the capacitance for a 50-micron distance between a qubit chip and an interposer chip as a function of the distance d, which corresponds to the design of the ground plane, according to an embodiment of the present invention.

FIG. 6 is a graph illustrating the capacitance for a 50-micron distance between the qubit chip 510 and the interposer chip 520 as a function of the distance d, which corresponds to the design of the ground plane 540. The capacitance, as well as the change in resonant frequency for a qubit, can be tuned by varying the distance d parameter of the ground plane 540.

In the following paragraphs, a procedure for choosing the frequencies used as "colors" in a layout design is described in detail. Specifically, there is described, according to some embodiments, a procedure for choosing a preferred set of qubit frequencies that will optimally reduce the risk of collisions in a manufactured quantum computing chip. As stated above, the chosen set of frequencies are referred to as a set of "colors" as the problem of choosing qubit frequencies bears some resemblance to a classic map coloring problem, or equivalently to a classic graph coloring problem, wherein the interconnections in the computing chip layout are represented as a graph. The following paragraphs also provide a detailed explanation of the steps labeled "Color Plan" and "Color choices for each qubit" in the flow chart of FIG. 1.

A goal of the frequency assignment method described herein according to some embodiments is to improve the operation of a quantum computing system that comprises a set of interconnected qubits, and more specifically to reduce (e.g., minimize) the risk of gate degradation via unintended excitation of inappropriate transitions in the physical qubits. The term "gate" is a term of art referring to a reversible quantum computing operation carried out on a working state of a quantum computing system.

Figure 7:
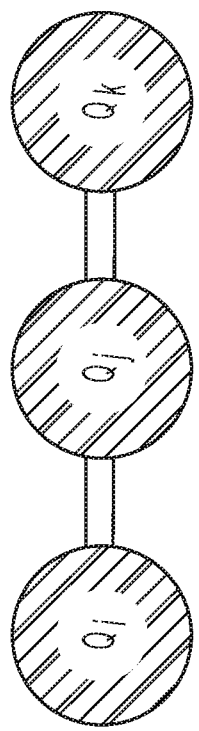
FIG. 7 shows the relative positions of nearest-neighbor qubits i,j and next-nearest neighbor qubits i,k relevant to seven different types of frequency collision, according to an embodiment of the present invention.

FIG. 7 shows the relative positions of nearest-neighbor qubit pairs i,j and j,k, and next-nearest neighbor qubits i,k, which together form qubit triplet i,j,k. TABLE 2 shows seven kinds of "collision conditions" that cause these undesired transitions according to the defining model of such unwanted excitations that will be used as an example herein, according to some embodiments of the present invention. These collisions are an example of the set of potential collisions that may be of concern during so-called cross-resonance gate operation of transmon qubits, these latter being well known in the art as a form of quantum computing gate operations. TABLE 2 lists the specific frequency degeneracies that excite unwanted transitions of concern, but some embodiments do not merely choose a set of frequency assignments that avoid these undesirable degeneracies, i.e. in some embodiments it does not suffice to simply choose frequency assignments for the lattice graph colors that avoid the exact degeneracies specified. Instead, some embodiments take the following additional considerations into account.

TABLE 2

| Type | Description | Collision condition | Minimum margin example | Participants |
|---|---|---|---|---|
| 1 | Nearest-neighbor 01 vs 01 | $f_j = f_i$ | 17 MHz | Any two connected qubits i,j |
| 2 | Nearest-neighbor 01 vs 02/2 | $2f_j = 2f_i - |\delta|$ | 4 MHz | Any two connected qubits i,j |
| 3 | Nearest-neighbor 01 vs 12 | $f_j = f_i - |\delta|$ | 30 MHz | Any two connected qubits i,j |
| 4 | Slow gate | $f_j - |\delta| > f_i$ or $f_i < f_j$ | 30 MHz | Control qubit i, target qubit j |
| 5 | Next-nearest-neighbor 01 vs 01 | $f_k = f_i$ | 17 MHz | Two qubits i,k connected to a qubit j which functions as a control qubit. |
| 6 | Next-nearest-neighbor 01 vs 12 | $f_k = f_i - |\delta|$ | 25 MHz | Two qubits i,k connected to a qubit j which functions as a control qubit. |
| 7 | Spectator | $f_i + f_k = 2f_j - |\delta|$ | 8.5 MHz | Control qubit j, target qubit k, spectator qubit i connected to j. |

First, that the finite bandwidths of the gate driving signals and of the qubit transitions imply that each forbidden collision band should include a finite bandwidth margin surrounding the exact degeneracy condition. Second, that unavoidable manufacturing errors can give rise to collisions even when the nominal design is collision-free. Such manufacturing errors can be of concern in transmon qubits, since the transition frequencies in transmon qubits are almost evenly spaced, i.e. transmon qubits behave in similar fashion to quasi-harmonic oscillators with weak anharmonicities $\delta$.

The first of these additional considerations can be accounted for by specifying a set of minimal collision avoidance margins that are taken into account when defining the collision conditions of concern. More specifically, we may require that the qubit 0→1 transition frequencies, denoted f, must avoid the Types 1 to 7 degeneracies described in TABLE 2 by margins denoted, respectively, $m_1$ to $m_7$ (where these margins have units of frequency, and may be of order of about 10 MHz when transmon qubits are used). The margins $m_1 \ldots m_7$ are typically defined by the bandwidths of the qubit drive signals and the duration of the gate operations performed by the qubits. These m margins are generally quite small in comparison with the magnitude of the anharmonicity, with the anharmonicity (negative for transmon qubits) being commonly of order of about 300 MHz in magnitude. Anharmonicity refers to the deliberately introduced separation between the 1→2 transition frequency and the 0→1 transition frequency. As in the table above, we denote the anharmonicity as $\delta$, and in the example equations used herein $\delta$ is assumed to be negative, as is generally the case with transmon qubits. TABLE 2 uses example tolerance ranges on the various collision conditions to convey a set of example m margins. For example, the exact collision condition described by the first non-header row of TABLE 2 corresponds to two connected qubits having the same 0→1 frequency, so that if the frequencies of two connected qubits are denoted $f_j$ and $f_i$, the corresponding exact collision condition could be written as $f_j=f_i$. However, under a reasonable set of bandwidth conditions, an operation involving the 0→1 transition of one of these qubits might improperly excite the 0→1 transition of the other qubit if it were the case that the two qubit frequencies, even though unequal, were nonetheless closer to one another than, as an example, 17 MHz. Thus, the first collision condition listed in TABLE 2 could alternatively be written $f_j \cong f_i, \pm 17$ MHz, with 17 MHz being an example m margin for this collision condition, in particular an example $m_1$ margin.

Taking the required margins ($m_1$ to $m_7$) into account, a collision of Type 1 to 4 can be considered to occur between a pair of qubits i and j that are connected in the lattice whenever their frequencies $f_i$ and $f_j$ satisfy one of the following equations (Equations (0.1) to (0.4), respectively):

(Type 1)

$$m_1 \geq |f_i - f_j| \tag{0.1}$$

(Type 2)

$$\text{If } f_i > f_j: \frac{|\delta_i|}{2} + m_2 \geq f_i - f_j \geq \frac{|\delta_i|}{2} - m_2 \tag{0.2}$$

$$\text{If } f_j > f_i: \frac{|\delta_j|}{2} + m_2 \geq f_j - f_i \geq \frac{|\delta_j|}{2} - m_2$$

(Type 3)

-continued $$|\delta_i| + m_3 \geq f_i - f_j \geq |\delta_i| - m_3 \tag{0.3}$$
OR
$$|\delta_j| + m_3 \geq f_j - f_i \geq |\delta_j| - m_3$$

(Type 4)

$$f_i - f_j \geq |\delta_i| + m_4 \tag{0.4}$$
OR
$$f_j - f_i \geq |\delta_j| + m_4$$

The Type 5 to 7 collisions involve triplets of connected qubits; specifically, triplets in which qubit j is connected to both qubit i and qubit k. For simplicity we will assume in this illustrative example that qubits i and k are not directly connected to each other. A collision of Type 5 or 6 or 7 will then occur if the corresponding equation in the following set is satisfied:

(Type 5)

$$\text{If } [\{(f_j \geq f_i) \text{ OR } (f_j \geq f_k)\} \tag{0.5}$$
AND
$$m_5 \geq |f_i - f_k|]$$
If $[\{(f_j \geq f_i) \text{ OR } (f_j \geq f_k)\}$
AND (Type 6)

$$(|\delta_i| + m_6 \geq f_i - f_k \geq |\delta_i| - m_6] \tag{0.6}$$
$$|\delta_k| + m_6 \geq f_k - f_i \geq |\delta_k| - m_6])$$

(Type 7)

$$\text{If } [\{(f_j \geq f_k) \text{ OR } (f_j \geq f_i)\} \tag{0.7}$$
AND
$$m_7 \geq \left|f_j - \frac{f_i + f_k}{2} + \frac{\delta_j}{2}\right|\}]$$

As stated previously, anharmonicity $\delta$ is assumed to be negative herein. An additional qualification is that, strictly speaking, Equation (0.4) does not describe a true collision condition. Instead, Equation (0.4) describes a problematic condition of a different kind, in which two connected qubits are found when manufactured to be relatively too far separated in frequency to be capable of jointly executing desired gates. For convenience, this problematic condition is treated as an additional kind of collision in the detailed examples discussed below.

While the above collision conditions involve differences between transition frequencies, it is also noted that there are often absolute engineering limits on feasible qubit frequencies, as understood by those skilled in the art. However, in the present discussion such range limitations are regarded as being a separate issue from the collision concern.

A goal according to some embodiments of the present invention is to determine design frequencies for a given lattice that successfully avoid all of the collision types described by Equations (0.1) to (0.7), in every qubit in the lattice. Moreover, in some embodiments, we seek to avoid these collisions by as large a margin as possible in order to reduce or minimize the potential impact of manufacturing errors (the second consideration highlighted above). In some embodiments of the present invention, this can be done by first choosing a set of "colors" which each represent a range of allowed frequencies (thus forming a "Color Plan" as depicted in step 114 of the flow chart in FIG. 1). A color choice is then assigned to each qubit in the lattice (i.e., we make "Color Choices for each Qubit" as depicted in step 116 of the flow chart in FIG. 1), with the color assignments and specific frequencies within the bands being iteratively adjusted per the flow chart in FIG. 1.

As shown in the FIG. 1 flow chart, the iteration process essentially modifies the set of frequency assignments by adjusting out any collisions or near-collisions (where near-collision refers to an overly small margin against fabrication errors) as assessed by considering all neighbors of each given qubit out to a distance covering two connections, i.e. covering neighbors and next nearest neighbors. Before starting this process of iterative adjustment, an initial Color Plan is devised first in order to devise an initial set of Color choices for each qubit.

A comparatively simple example can be used to explain how these initial steps may be carried out. First, for simplicity, it is assumed that every interconnecting bus in the quantum chip links only two qubits. The lattice can then immediately be represented as a mathematical graph entity (as the term "graph" is used in discrete analysis), with the graph vertices representing the qubits and the graph edges representing the interconnects. A graph representation can still be created if some physical buses link more than two qubits, by adding separate edges to represent each interconnection.

A convention is selected to give familiar color names to the transition frequencies (or to the frequency bands) that are assigned to each qubit even though such nomenclature is entirely non-physical (since the transition frequencies have no physical connection to the color names used). The non-physical terminology is employed in deference to the familiar mathematical problem of assigning colors to the vertices of a graph in such a way that connected vertices never share the same color, analogous to preventing the same transition frequency from being assigned to two interconnected qubits (which if allowed would cause a collision per Equation (0.1)).

Four colors suffice to label the vertices of any graph in such a way that no directly connected qubits share a common color; such a coloring thus provides the first step in a desirable deployment of frequencies which are offset from their interconnected neighbors in such a way as to avoid collisions. Though four colors suffice for a general lattice, our explanatory example considers for simplicity the common case in which the lattice graph of interest can be colored to avoid collisions using only three distinct colors, which are labeled somewhat arbitrarily as "red", "gray", and "blue", bearing in mind that each of these arbitrary color names actually designates a distinct qubit transition frequency, or a partially distinct band or range of frequencies. Lattice interconnections in quantum processors are often kept sparse in order to minimize unwanted interactions, and graphs that are deliberately made sparse in this way are more likely to be colorable using only three distinct shades, as opposed to requiring four. As discussed above, even when the lattice graph has a chromatic number of two it may be desirable to use three colors when assigning qubit frequencies (and any graph that is two-colorable is also three-colorable as long as it has more than two vertices).

Lattices are sometimes designed such that one qubit in every pair of interconnected qubits is considered to be a control qubit when carrying out gate operations, and in order to minimize unwanted interactions the lattice may further be designed in such a way that these control qubits are only connected to at most two other qubits (e.g. by at most two interconnecting buses). As shown below, the more specific case in which a control qubit of this kind connects to only one other qubit (instead of two) can in fact be covered by a color assignment plan which assumes that there is at least one qubit on every bus that connects to exactly two other qubits. Therefore, the descriptive example to follow can immediately cover the more general case in which a control qubit may connect to either one or two other qubits by merely supposing that there are exactly two connections for each such control qubit. In lattices of the latter kind a color plan can be used in which one qubit on every bus (which will be the control qubit in some embodiments) is assigned to a single particular color, arbitrarily chosen as "gray" in the description to follow, with all gray-colored qubits 810 being qubits that connect to two other qubits (which will be non-gray), for example red qubits 820 and blue qubits 830, as shown in the example lattice of FIG. 8.

Figure 8:
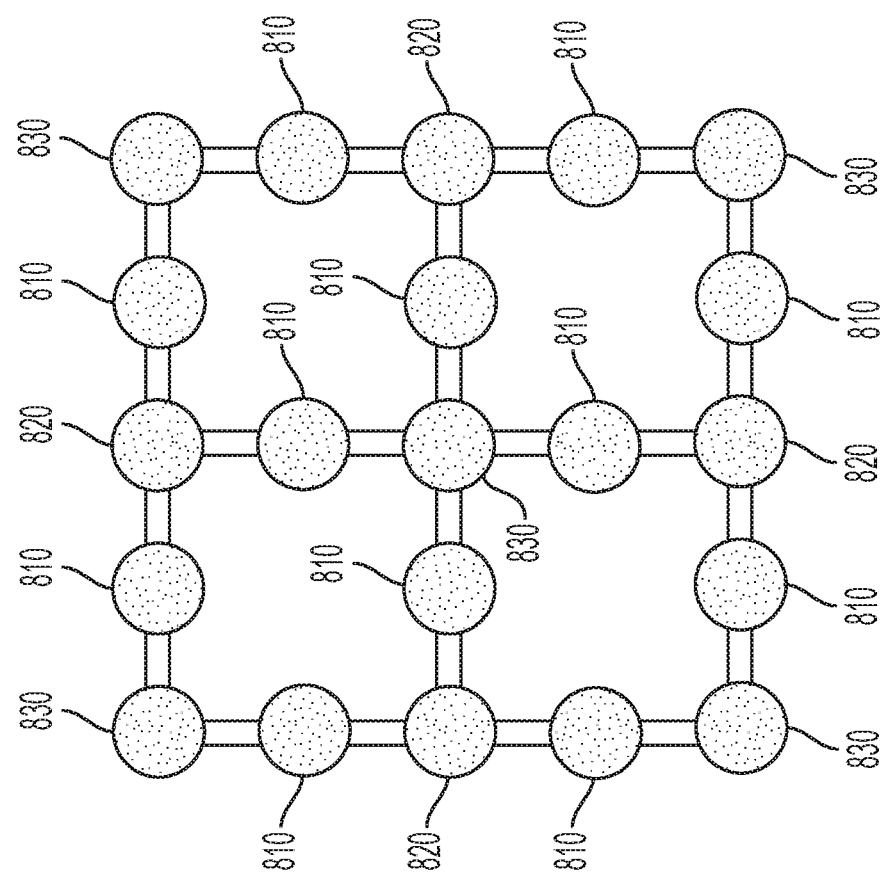
FIG. 8 illustrates a rectangular (square) lattice of qubits, according to some embodiments of the present invention.

Since we are focusing on examples where the lattice is three-colorable, and in which all "gray" qubits 810 are connected to two other qubits 820, 830, it follows that if we conceptually delete all gray vertices from the lattice graph (while merging the two edges that connect to each gray vertex so as to form a single edge in the pruned graph), the resulting pruned graph will be two-colorable. Two-colorable graphs are known to be bipartite, which can be defined as the property of having no closed cycles (between the red and blue vertices) that contain an odd number of vertices (not counting traversals through gray qubits 810, which are considered to be deleted). Many sparse lattices are three-colorable in this way (i.e., they contain gray-class qubits/vertices that connect to one or two non-gray qubits/vertices) and which contain two groups of non-gray qubits/vertices 820, 830 (which are arbitrarily designated as "red" and "blue"). The even-cycle requirement (when the gray vertices are excluded) can be compatible with many sparse lattice configurations, and these may be e.g. linear, rectangular, or hexagonal in their layout arrangement. FIG. 8 shows an arbitrary example of such a rectangular (square) lattice, while FIG. 12 illustrates another exemplary lattice.

Lattices of this kind can be particularly suitable for explaining some embodiments, because with such lattices it is possible to capture collision avoidance criteria for all qubits by devising a Color Plan that is directly designed to avoid collisions (as robustly as possible) in only a single archetypal triplet of qubits, and in two associated configurations of paired qubits, with this Color Plan then being immediately applicable to the entire lattice. However, other Color Plans for other kinds of lattices can be handled with the same general approach as is described below using the above class of 3-colorable lattices as an example, except that additional triplet and pair combinations must be considered in the analysis in order that the entire lattice be colorable using the analyzed triplet and pair combinations.

To keep our description simple, we use as an example lattices of the simple form described above, i.e. lattices that are entirely colorable using triplets in which a gray qubit 810 is connected exclusively to (at least one of) a so-called "red qubit" 820 and a "blue qubit" 830. Each red qubit 820 and blue qubit 830 in such lattices may be members of multiple triplets (as with the red qubits and blue qubits in the FIG. 8 example), but their red or blue color assignment is applicable in every triplet that they participate in. All pairs of interconnected qubits in such lattices are either paired red qubit 820 and gray 810 qubit, or paired blue qubit 830 and gray qubit 810, and these two kinds of pairs can be understood as the two pairs that together form a red-gray-blue triplet (i.e. a triplet where a gray qubit connects exclusively to a red qubit and to a blue qubit).

In order to avoid collisions within (either) one of the fundamental pairs (i.e., a red-gray pair or a blue-gray pair), we choose red or blue frequencies (along with the gray frequency) that avoid all of the collision bands defined by Equations (0.1) to (0.4), which are essentially inequality equations. For any single collision band boundary, the requirement for such a successful frequency assignment might seem equivalent to reversing the inequality in the corresponding equation that defines the collision boundary in question. However, when all collision inequalities are considered together the resulting feasible domain is non-convex, and is in fact disjoint, so each of the appropriate constraint inequalities is only applicable in a portion of the feasible domain. To inactivate the remaining inapplicable constraints in a suitably contingent way we can use the so-called "big-M method". In particular, the big-M method introduces binary variables (e.g. a binary variable b) whose only allowed values are 0 and 1, and then adds terms to the constraint inequalities that take the form e.g. M*b, where M is large enough (and is introduced on the appropriate side of the inequality) that when b is 1 the inequality is automatically satisfied by any reasonable values of the other variables, thanks to the large weight of the M factor that is then present. Conversely, when b is 0 the M*b term is absent or vanishes, and the constraint becomes potentially active, since the M factor is no longer present to make the inequality automatically satisfied. In a similar way we can add a term $(1-b)*M$ to any complementary constraint that applies in a disjoint region of the feasible domain. Multiple binary variables can be employed to specify different regions of the feasible domain, and we will employ a convention in which all binary variable names begin with the letter "b" (with such names also being exclusive to variables that are binary).

Therefore, to avoid collisions of Types 1 to 4, the frequencies of a pair of interconnected qubits should satisfy all inequalities in the following three equation groups:

$$f_i - f_j + M_1 b_1 > m_1$$

$$f_i - f_j - M_1(1-b_1) < -m_1 \quad \text{(Type1)[1.1]}$$

$$f_i - f_j + M_2(1-b_2) + |\delta|/2 > m_2$$

$$f_i - f_j - M_2(1-b_2) - |\delta|/2 < -m_2$$

$$f_i - f_j + M_2(b_1+b_2) - |\delta|/2 > m_2$$

$$f_i - f_j - M_2(1-b_1+b_2) + |\delta|/2 < -m_2 \quad \text{(Type2)[1.2]}$$

$$f_i - f_j > -|\delta| + m_{34}$$

$$f_i - f_j < |\delta| - m_{34} \quad \text{(Types 3 and 4)[1.3]}$$

Considering Equation [1.1] as an example, it is seen that binary variable $b_1$ reflects the fact that when a pair of connected qubits avoids a Type 1 collision, the frequencies of the pair (in the form of a frequency separation) will fall on either one side or the other side of the associated collision band, i.e. only on one side but not the other, depending on which qubit of the pair is the qubit having a sufficiently larger frequency than the other so as to avoid the collision. Thus, if a change is considered in the frequency of one of the qubits, only the boundary on one side of the collision band will affect whether the associated collision avoidance margin is increased or decreased. As will be seen, this illustrates how some embodiments of the invention employ binary variables to specify the particular collision boundaries which define the collision avoidance margins that are potentially relevant to a qubit's collisional yield impact (or, put differently, how the binary variables specify the collision boundaries that are potentially active). More generally, some embodiments use binary variables to determine the specific collision boundaries that are potentially relevant to the yield impact of one or more of the qubits that are assigned to a particular color in a Color Plan. It should be understood that when a collision avoidance margin is maximized in accordance with the invention, the margin that is maximized will be a margin that separates e.g. a qubit frequency (or, for example, the mean frequency of a color band) from those collision boundaries that are potentially relevant (i.e. potentially active) for the qubit involved (or for one or more of the qubits assigned to a particular color).

To simplify our example calculation, Equations [1.1] to [1.3] have made the approximation that the anharmonicities of all qubits are equal, this common anharmonicity being denoted $\delta$. Equation [1.3] also assumes that since $m_3$ and $m_4$ are both small compared to $|\delta|$, the complement to Equations (0.3) and (0.4) can be covered with a single equation governed by margin $m_{34}$ (which might be set equal to $m_3$). Equation [1.3] thus serves to avoid both Type 3 and Type 4 collisions.

To find an initial Color Plan for the lattice graph as a whole, we consider that the fundamental red-gray-blue triplet is composed of two distinct edge pairs, namely red-gray and blue-gray. To write out a full set of equations for the lattice we need to use a notation that distinguishes between these two distinct edge types. Since mathematical notation customarily uses numerical indices (rather than color names) to distinguish different instances of a non-unique quantity, we will introduce indices "1", "2", and "3" to designate qubits that are, respectively, red-colored, blue-colored, and gray-colored in the Color Plan. Thus, the two end qubits of the fundamental triplet are given indices 1 (red) and 2 (blue), while the center qubit is given index 3 (grey). As an example of this convention, the general binary variable $b_2$ that appears in Equation [1.2] is written more specifically as $b_{2;3,1}$ when the specific case of a red-gray qubit pair is considered, whereas a binary variable of the $b_2$ type that applies to a blue-gray pair would be written $b_{2;3,2}$. All gray-colored qubits 810 in the plan are assigned the same band of allowed frequencies, and we can consider $f_i$ to designate the center frequency of this band, i.e. in Equations [1.1] to [1.3] we regard frequency index i as designating the gray-colored qubit. However, the equations to follow will switch to a triplet-specific notation using indices 1, 2, and 3. In particular, since we are using index 3 to designate qubits that are colored gray 810 in the Color Plan, we can re-write the "gray frequency" as $f_3$, with a similar convention applying to the other two colors. More generally, if the red, blue, and gray colors refer to three different groups of frequencies where the frequencies in each group share similar potential collisions, we denote the mean frequencies of the groups as $f_1$, $f_2$, and $f_3$, respectively. As a more detailed example of this convention, we show below (in Equation [2]) how Equations [1.2] are re-written to apply to red-gray connected pairs in the lattice:

$$f_3 - f_1 + M_2(1-b_{2;3,1}) + |\delta|/2 > m_2$$

$$f_3 - f_1 - M_2(1-b_{2;3,1}) + |\delta|/2 > -m_2$$

$$f_3 - f_1 + M_2(b_{1;3,1} + b_{2;3,1}) - |\delta|/2 > m_2$$

$$f_3 - f_1 - M_2(1-b_{1;3,1} + b_{2;3,1}) + |\delta|/2 < -m_2 \quad \text{(Type2 for Red-Gray Pairs)[2]}$$

Equations to rule out Type 2 collisions in blue-gray pairs can be obtained by replacing all occurrences of substrate index 1 in Equation [2] with index 2 (but with binary variable $b_{1;3,1}$ being changed only in its last index, i.e. to $b_{1;3,2}$).

Moreover, by similar steps to the above we can obtain complementary inequalities to Equations (0.5) to (0.7) that (collectively) ensure that no collisions of Types 5 to 7 will occur in any red-gray-blue triplet of connected qubits. To obtain a complete Color Plan we then need to combine these triplet equations (shown below) with equations that rule out Types 1 to 4 collisions in red-gray and blue-gray pairs. Such a Color Plan will also be applicable to lattices which when colored contain an isolated blue-gray or red-gray pair that is not part of a triplet, i.e. lattices that contain one or more gray-colored qubits 810 that only connect to one other qubit (red or blue), rather than to both a red-colored qubit 820 and a blue-colored qubit 830.

However, a further step needs to be implemented before this example Color Plan can be devised. Inequality equations like Equation [2] ensure that the nominal plan avoids collisions, but (per the second consideration noted above) manufacturing fluctuations can prevent the nominal Color Plan from being exactly realized, so in preferred embodiments the Color Plan adds the largest possible additional margins to the minimum required margins $m_1 \ldots m_7$. This can be represented mathematically by converting inequality equations such as [2] to equality equations wherein an added slack variable specifies the additional margin that has successfully been added. Each slack variable is required to have a minimum value of zero, corresponding to a Color Plan in which a particular collision is just barely avoided, i.e. when the overall margin achieved just reaches the required minimum m. The example Equations presented below use a convention in which all slack variables begin with "s".

Generally, one finds that some collisions are easy to avoid by a large margin in a particular lattice, while other collisions are less manageable, and collisions that cannot be avoided by relatively large margins will often turn out to dominate the overall lattice yield, that is, the likelihood of producing a collision-free chip. The probability distribution for errors in manufactured frequency is likely to have tails that fall off relatively very rapidly, so that collisions which are avoided by a substantial margin tend to have essentially no impact on overall yield. On these grounds, a reasonable criterion for finalizing a Color Plan is to require that whichever slack margin turns out to be smallest should be made as large as possible. As it must be appreciated, different slacks may be weighted differently in such a criterion.

Before showing how this calculation can be carried out, we make a further assumption to reduce the complexity of our demonstration example. In particular, we reiterate that advantages arise from lattices which are 3-colorable in the manner described above, i.e. in which one of the colors (in our case "gray") is exclusively used for qubits with at most two connected qubits. Specifically, such designs may be chosen in order to give the gray-labeled qubits a so-called control role, which with transmon qubits means that the 0→1 transition frequency of these control-role qubits must be higher than the frequency of the qubits they control, meaning that $f_3 > f_1$ and $f_3 > f_2$ under our notation. To simplify our demonstration example we require that gray-colored qubits 810 maintain this control capability; this is enforced in the Color Plan by requiring that binary variables $b_{1;3,1}$ and $b_{1;3,2}$ both be 0.

For convenience we also introduce two further simplifications in notation that reduce the lexicographic complexity of our equations. First, instead of using elaborate subscripts in our variables, we simply merge all subscripts into the variable names in which they occur, e.g. so that binary variable $b_{1;3,1}$ will simply be written as b131. Second, we introduce a single variable ftdel31 to represent the frequency difference $f_3-f_1$, and likewise we use ftdel32 to represent $f_3-f_2$.

Under this simplified notation, the equations that prevent the occurrence of Types 1 to 7 collisions in the Color Plan become $$ftdel31 = m1 + s31slack1c1 \qquad [2.1]$$

$$ftdel31 + m2 + s31slack2c2 = \frac{|\delta|}{2} + (1-b231)M2 \qquad [2.2]$$

$$ftdel31 + b231M2 - s31slack2c3 = \frac{|\delta|}{2} + m2 \qquad [2.3]$$

$$ftdel31 + m34 + s31slack34c2 = |\delta| \qquad [2.4]$$

$$ftdel32 = m1 + s32slack1c1 \qquad [2.5]$$

$$ftdel32 + m2 + s32slack2c2 = \frac{|\delta|}{2} + (1-b232)M2 \qquad [2.6]$$

$$ftdel32 + b232M2 - s32slack2c3 = \frac{|\delta|}{2} + m2 \qquad [2.7]$$

$$ftdel32 + m34 + s32slack34c2 = |\delta| \qquad [2.8]$$

$$ftdel31 - ftdel32 + slack5c1 = b5M5 - m5 \qquad [2.9]$$

$$ftdel31 + (1-b5)M5 = ftdel32 + m5 + slack5c2 \qquad [2.10]$$

$$ftdel31 + |\delta| + m6 + slack6bc1 = ftdel32 + (b5+b6)M6a \qquad [2.11]$$

$$ftdel31 - ftdel32 - slack6ac2 + M6a = (b5-b6)M6a + |\delta| + m6 \qquad [2.12]$$

$$ftdel31 + |\delta| + (1-b6)M6b = ftdel32 + m6 + slack6bc3 \qquad [2.13]$$

$$ftdel31 + m6 + slack6bc4; 4 = ftdel32 + |\delta| + (1-b6)M6b \qquad [2.14]$$

$$ftdel31 + ftdel32 + 2b7M7 = |\delta| + 2(m7 + slack7c1) \qquad [2.15]$$

$$ftdel31 + ftdel32 + 2(m7 + slack7c2) = |\delta| + 2(1-b7)M7 \qquad [2.16]$$

The slack variables in Equations [2.1] to [2.16] are those that begin with the letter "s" (for example, slack variable s31slack1c1 in Equation [2.1]), and collisions are avoided in a Color Plan described by these equations as long as all slack variables are greater than 0. To make the Color Plan maximally robust against manufacturing errors, some embodiments choose the Color Plan per Equations [2.1] to [2.16] that achieves the largest possible value in whichever of its slack values turns out to be smallest. Each disjoint region of the feasible domain may contain a solution with a locally maximal value of the smallest slack, and the different disjoint regions of the feasible domain correspond to different choices of the binary variables. After a given choice of binary variables has been made, we can discard any constraints that contain an uncanceled M term, since the M term will be large enough to ensure that the equation will be satisfied by a slack value that is too large to be gating (i.e. the slack involved will be non-smallest). All other constraints should be considered potentially active, i.e. they may prove to contain the smallest slack (whose value will nonetheless be made as large as possible at the solution).

For example, suppose we consider the binary variable choice $$b231=b232=b5=b6=b7=1[ \qquad 2.17]$$

The potentially binding constraints in this region of the feasible domain are then $$ftdel31 = m1 + s31slack1c1 \qquad [3.a]$$

-continued $$ftdel31 + m2 + s31slack2c2 = \frac{|\delta|}{2} \quad [3.b]$$

$$ftdel31 + m34 + s31slack34c2 = |\delta| \quad [3.c]$$

$$ftdel32 = m1 + s32slack1c1 \quad [3.d]$$

$$ftdel32 + m2 + s32slack2c2 = \frac{|\delta|}{2} \quad [3.e]$$

$$ftdel32 + m34 + s32slack34c2 = |\delta| \quad [3.f]$$

$$ftdel31 = ftdel32 + m5 + slack5c2 \quad [3.g]$$

$$ftdel31 + |\delta| = ftdel32 + m6 + slack6bc3 \quad [3.h]$$

$$ftdel31 + m6 + slack6bc4 = ftdel32 + |\delta| \quad [3.i]$$

$$ftdel31 + ftdel32 + 2(m7 + slack7c2) = |\delta| \quad [3.j]$$

Figure 9:
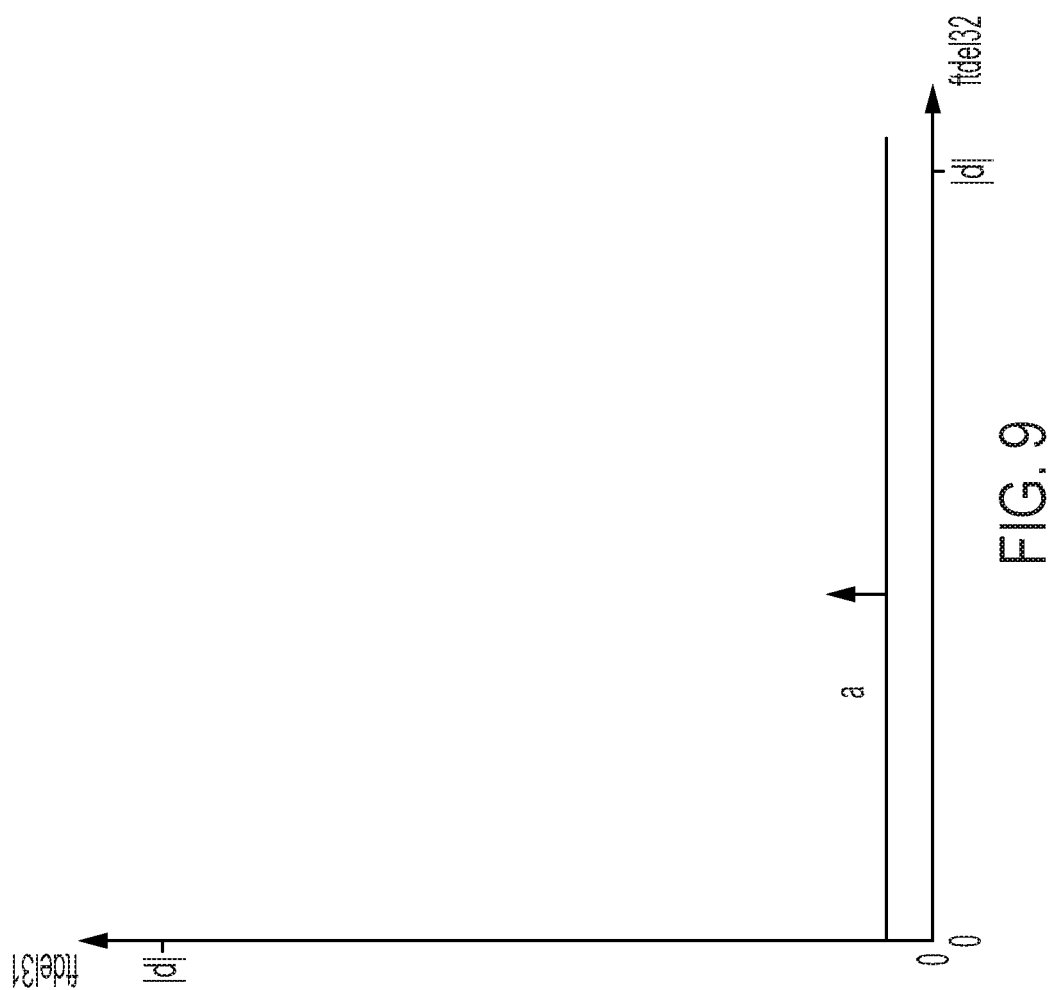
FIG. 9 is a graph illustrating slack margin constraints for qubit frequency differences according to some embodiments.

It is convenient to analyze these constraints within the two-dimensional space spanned by variables ftdel31 and ftdel32. Since the gray-labeled qubits are assumed to be control qubits of the transmon type in this example embodiment, the feasible domain entailed by Equations [3.a] to [3.j] will lie within the first quadrant of the plane spanned by ftdel31 and ftdel32. FIG. 9 uses a plot of this quadrant to show schematically the restriction imposed by the first of these constraints (Equation [3.a]). It should be understood that the dimensions in this schematic plot are only qualitatively illustrative.

The minimum acceptable value of the slack variable used in Equation [3.a] (namely s31slack1c1) is by definition 0, and in graphical terms a bounding edge of the feasible region (under the Equation [2.17] choice of binary variable values) is formed by Equation [3.a] at this limiting slack value of 0. This domain edge is plotted in FIG. 9 as the horizontal line labeled "a". A small arrow is shown in the plot pointing upward from line "a"; this arrow indicates schematically that solutions with greater margin against manufacturing error are found as one moves deeper into the feasible region away from this edge, i.e. as the slack s31slack1c1 is increased from its minimum acceptable value of 0 (with points lying below line "a" being unacceptable as solutions, i.e. Equation [3.a] essentially cuts this lower region beneath line "a" out of the feasible domain).

Figure 10:
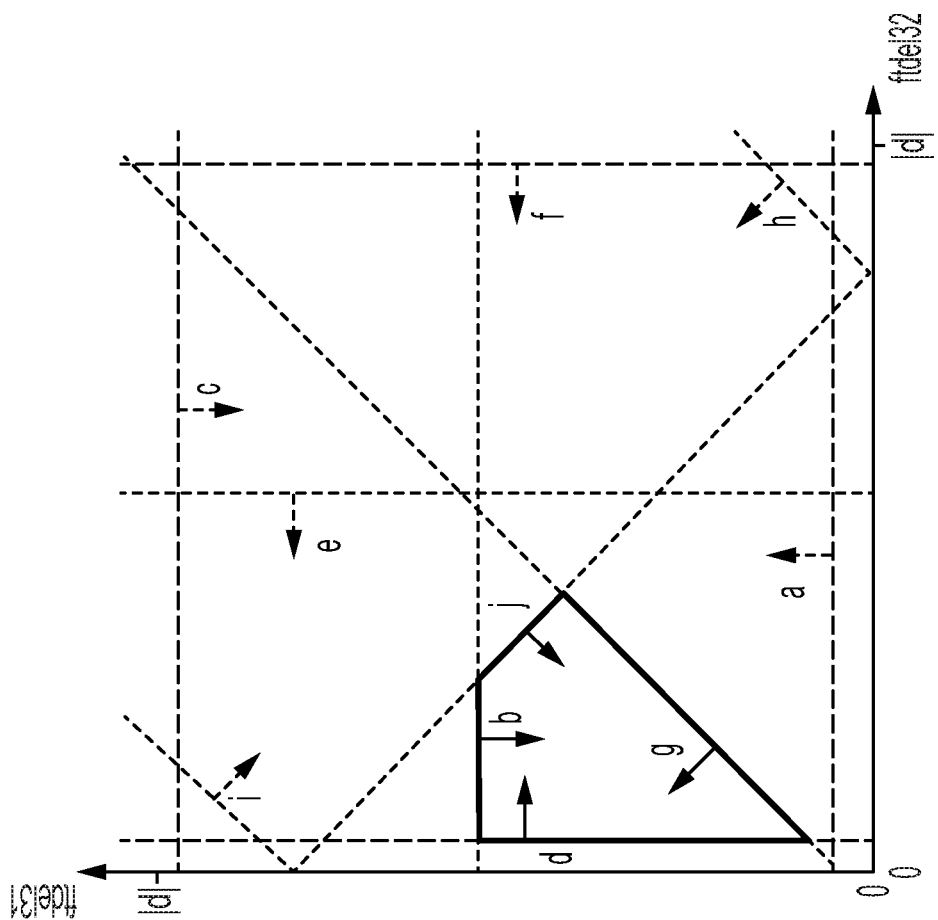
FIG. 10 is a graph illustrating a full set of bounds for slack margin constraints, according to some embodiments of the present invention.

Each equation in the set [3.a] to [3.j] introduces its own bounding edge in the feasible domain, and these edges can be represented in the same manner that FIG. 9 shows for Equation [3.a]. FIG. 10 shows the full set of bounds defined by the [3.a] to [3.j] set (assuming the binary variable choice in Equation [2.17]). Note that line "a" has been given a dashed styling in FIG. 10. We use this styling to indicate that line "a" becomes a redundant cutoff once other constraints in the [3.a] to [3.j] set are introduced. As an example of this redundancy, we see from FIG. 10 that the edge introduced by constraint [3.g] cuts off virtually all of the solution-space portions that the FIG. 9 constraint [3.a] removes, and also that constraint [3.g] further cuts off a substantial adjacent portion as well, thereby making constraint [3.a] redundant. Such redundancy is indicated in FIG. 10 using a dashed line style.

Inspection of FIG. 10 shows that major portions of the various constraint edges are rendered redundant by other constraints. More specifically, the only non-redundant constraint edges remaining in the figure are those which form the quadrilateral region indicated by heavy solid lines; this quadrilateral is formed by portions of the edges from constraints [3.b], [3.d], [3.g], and [3.j].

In some embodiments we seek a Color Plan in which the smallest slack margin is made as large as possible. Study of the abovementioned quadrilateral region in FIG. 10 shows that this will occur when the slacks that govern Equations [3.b], [3.d], and [3.g] are made equal to each other, since it can be seen that inequality of these slacks would imply that the smallest among them has not been maximized. In other words, if one or two of these slacks are larger than the smallest slack(s), it will be possible to trade off the magnitude of the former in order to achieve an increase in the latter, whereas if the 3 slacks are equal no possible adjustment allows all 3 to be further increased. Note that for any given solution point in FIG. 10, the horizontal or vertical distance between the solution point and any of the constraint boundaries will equal the slack value by which the particular constraint boundary is exceeded.

Figure 11:
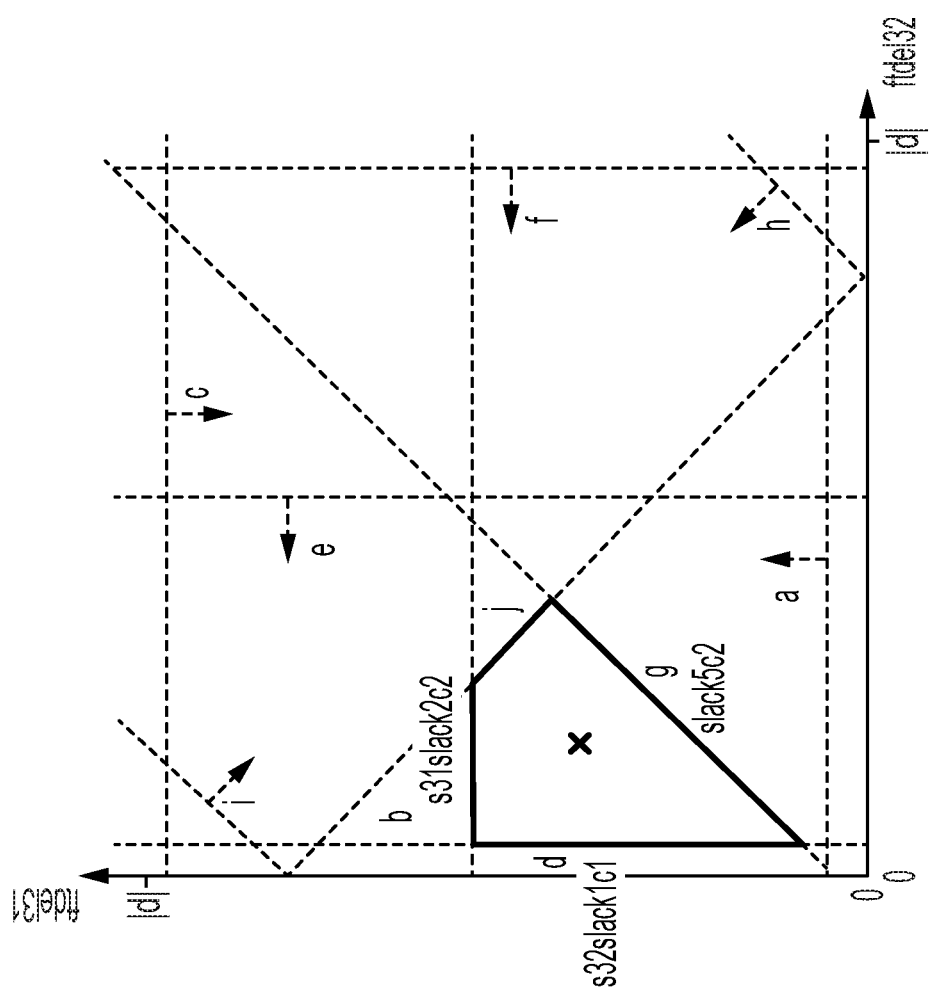
FIG. 11 is a graph illustrating a solution entailed by the equality of the slack margins, according to some embodiments of the present invention.

FIG. 11 shows schematically the solution entailed by equality of these slacks, indicating this preferred solution with an "X". Other points within the quadrilateral will be closer to at least one of the 3 binding edges than is the case for this preferred solution, meaning that manufacturing errors would increase the likelihood of the most probable (i.e. smallest-slack) collision if such a non-preferred solution were chosen. One would be able to make the likelihood of the less-probable collisions even smaller with such a non-preferred choice, but this would usually net out as an unfavorable yield tradeoff. FIG. 11 also indicates specifically that the preferred solution is governed by slack variables s31slack2c2, s32slack1c1, and slack5c2. Study of FIG. 11 further suggests that the slack governing the fourth side of the feasible quadrilateral (namely slack7c2, which appears in Equation [3.j]) will not be gating at the solution, i.e. this latter slack will be larger than the maximized minimal value achieved simultaneously by gating slacks s31slack2c2, s32slack1c1, and slack5c2.

This solution can be developed algebraically be manipulating Equations [3.b], [3.d] and [3.g] to express each of their respective slacks (s31slack2c2, s32slack1c1, and slack5c2) in terms of the remaining non-slack variables, and then equating these resulting expressions to reflect the equality of the three gating slacks at the solution, yielding new equations which can be solved for all variables. Specifically, we find that at the solution:

$$ftdel31 = \frac{|\delta| + m1 - 2m2 + m5}{3} \quad [4.1]$$

$$ftdel32 = \frac{|\delta| + 4m1 - 2m2 - 2m5}{6} \quad [4.2]$$

$$s31slack2c2 = s32slack1c1 = slack5c2 \frac{|\delta| - 2(m1 + m2 + m5)}{6} \quad [4.3]$$

We also find that at this solution the slack in Equation [3.j] is given by:

$$slack7c2 = \frac{|\delta| - 2m1 + 2m2 - 2m7}{4} \quad [4.4]$$

In Equation [4.4] the coefficient of $|\delta|$ is larger than it is in Equation [4.3], and since $|\delta|$ is typically an order of magnitude larger than the m margins, we infer that slack7c2 will be somewhat larger than the gating slacks defined by Equation [4.3], thus confirming that (in this example) only the latter slacks will define the optimal solution (when they become equal to each other).

As a numerical example, if $\delta = -340$ MHz, $m1 = 17$ MHz, $m2 = 4$ MHz, $m34 = 30$ MHz, $m5 = 17$ MHz, $m6 = 25$ MHz, $m7 = 8.5$ MHz,     [4.5]

we find that:

$\text{ftdel31} = f_3 - f_1 = 122$ MHz, $\text{ftdel32} = f_3 - f_2 = 61$ MHz, $s31\text{slack2}c2 = s32\text{slack1}c1 = \text{slack5}c2 = 44$ MHz,     [4.6]

and $\text{slack7}c2 = 70$ MHz     [4.7]

Equations [3.a] to [4.4] only apply to the binary variable choice in Equation [2.17]. However, other combinations of binary values can be analyzed in the same way, and for the example numerical values shown in Equation [4.5] we find that the Equation [4.6] result (3rd line) for the worst-case margin is the largest possible result among all possible binary combinations, i.e. this solution is globally optimal. This solution is shown in the first row of Table 1, while the remaining rows show the solutions that are found with other combinations of binary variables.

The above example equations are not applicable as-is to lattices that are not colorable by the red-gray-blue scheme presented here, but the same approach can be used to cover more extensive combinations of triplets (and constituent pairs), with triplets being sufficient since collisions involve neighbors out to a depth of 2.

It should be noted that a solution like that in Equation [4.6] actually represents multiple solutions, first because the designer is free to swap the solutions for the red-colored and blue-colored qubits, and second because Equation [4.6] only specifies optimal differences in frequency, allowing the designer to freely choose the overall frequency scale (subject to any engineering limits that may be present on the absolute frequencies employed). This flexibility allows the designer to tailor the solution so as to (at least partially) accommodate any tuning limitations found in individual qubits.

Referring again to the flow chart of FIG. 1, the procedure just described results in the determination of the main items in a Color Plan. In particular, optimal frequencies have been chosen for a set of colors that are capable of coloring the lattice graph. If certain qubits cannot be tuned to achieve their optimal frequency, we may consider the frequency band for the color to include the full range in which all slacks in the collision equations are greater than zero.

In the flow chart of FIG. 1, determination of a Color Plan is followed in a some embodiments by a separate step of assigning a set of "Color choices for each Qubit" that potentially deviates from the Color Plan, with this potentially different set of choices being informed by the result of Measurements and Predicted Frequencies for each Qubit (as well as by the predicted feasible tuning range in some embodiments). More specifically, it is known in the art that measurements can often be carried out on a lattice and its constituent qubits in order to obtain useful predictions of the range of frequencies which are attainable in each qubit. Such measurements and resulting predictions may indicate that certain qubits are unlikely to be tunable to fit the initial Color Plan. In the embodiment shown in FIG. 1, one then assigns provisional revised frequencies to each such qubit, with a frequency collision checker then tabulating any resulting collisions (as found by checking all pairs and triplets, i.e. all qubit combinations out to 2nd neighbors), and with new potentially different frequency choices being made for each qubit involved in such new collisions. In preferred embodiments the revised frequencies are restricted to values which are predicted to be attainable based on the qubit measurements. This process continues in an iterative fashion until collisions are eliminated in the revised plan, if this proves possible. The tuning adjustments needed to achieve the final frequencies serve in effect as a recommended set of tuning adjustments.

In an embodiment maximizing the margin comprises maximizing the smallest of the margins that separate each of the mean frequencies of the plurality of frequency groups and each of the potentially active collision band boundary frequencies of the collision bands.

It should be understood that, in a preferred embodiment, the frequency collision checker is not limited to a simple binary assessment of whether or not a collision will occur given the current working set of frequency choices for each qubit. Instead, the collision checker can also assess the safety margin with which each potential collision is avoided under the current working set of frequency choices. The smallest such margin can serve as a metric to assess the overall status of the current set of frequencies. If this smallest margin is negative, the working set of choices does not succeed in preventing collisions. However, the iterative process of making new frequency choices to eliminate collisions should preferably be continued until further increases in the smallest (i.e. worst) margin can no longer be achieved. Even if the smallest margin remains negative after the procedure is halted in this way, the quantitative failure to avoid collisions will at least have been reduced to the best level found.

Conversely, if at some point the smallest margin is found to be positive during the process of iteratively assigning new frequency choices, the working solution can then be considered successful at avoiding collisions, but the process may nonetheless be continued in order to increase the worst margin, thereby providing further robustness against manufacturing errors. The iterative improvement process can be halted once further increases in the smallest margin can no longer be found.

Some embodiments of the current invention can test whether tuning limitations are severe enough to preclude non-zero yield by determining whether the smallest of the slack margins that are provided (when its recommended frequency adjustments are adopted) is greater than 0. Here "recommended frequency adjustments" refers to the adjustments that must be made to the frequencies of the different qubits in order to achieve the target frequencies generated according to an embodiment of the invention. These embodiments of the invention constrains its recommended frequency adjustments to ensure that they fall within the attainable range (as determined by qubit measurements), and the slack margins whose positivity indicates an avoided collision are the collision avoidance margins that result after excluding the bandwidth-associated minimum margins (i.e. after excluding the minimum margins denoted m above). By definition, the required minimum margins will all be successfully exceeded if and only if all slack margins are positive. When this is accomplished (i.e. when all slack margins are positive, which is equivalent to saying that the smallest slack margin is positive), a chip which is exactly tuned to operate at the target frequencies generated by an embodiment of the invention will successfully avoid collisions, and by construction these target frequencies will fall within the attainable range. Absent unrelated problems, the chip will then have a finite probability of yielding, i.e. of avoiding all collisions, though this yield probability will be less than 1, i.e. it will still be possible for collisions to nonetheless arise if manufacturing errors cause large enough deviations from the target frequencies.

Note that if the tails of the probability distribution for manufacturing error in a qubit's frequency fall off rapidly (e.g. as with a Gaussian distribution), the likelihood of a large error in frequency will be extremely small. For a manufacturing process to maintain significant yield from lattices that contain more than a few qubits, it is desirable that the probability of exceeding even the smallest collision margin be kept quite small; otherwise the probability of achieving a lattice that is free of collisions in every qubit will tend to become almost nil. This means that typical manufacturing errors must generally be kept within the tails of the distribution. Under this common scenario the probability of avoiding all collisions will then tend to be roughly maximized (at least to a reasonable approximation) when the smallest slack margin is made as large as possible (because margins that are significantly larger than the smallest margin are very unlikely to be exceeded).

If the smallest slack margin remains negative even after being maximized, the chip would not be free of collisions even if the manufactured qubit frequencies were to match the target frequencies exactly. Strictly speaking, there is in theory a very small but non-zero probability that a highly fortuitous (and extremely implausible) set of random manufacturing variations could just happen to produce a chip that was free of collisions even in this case, but as a practical matter we can consider a chip whose smallest margin is negative to have no probability of being collision-free.

The descriptions of the various embodiments have been presented for the purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of frequency allocation in a quantum chip having a plurality of qubits, comprising:
   determining, by a computer system a plurality of frequency groups based on a configuration of the plurality of qubits, wherein each frequency group of the plurality of frequency groups has a range of frequencies;
   determining, by the computer system, for each of the plurality of qubits, a qubit frequency;
   assigning a frequency group from the plurality of frequency groups to each of the plurality of qubits based on each respective qubit frequency;
   determining, by the computer system, for at least one qubit of the plurality of qubits that a frequency collision does not exist between said at least one qubit and neighboring qubits in the plurality of qubits based on the qubit frequency of said at least one qubit and at least one qubit frequency of the neighboring qubits; and
   adjusting on the quantum chip, the frequency of each of the at least one qubit to have a frequency in the range of frequencies of the frequency group to which that qubit was assigned based on the determination that a frequency collision does not exist between said at least one qubit and said neighboring qubits in the plurality of qubits.

2. The method according to claim 1, wherein the determining for the at least one qubit of the plurality of qubits whether a frequency collision exists between said at least one qubit and said neighboring qubits in the plurality of qubits comprises determining whether a neighboring qubit has a qubit frequency that falls within the frequency group of the at least one qubit.

3. The method according to claim 1, wherein the determining for the at least one qubit of the plurality of qubits whether a frequency collision exists between said at one qubit and neighboring qubits in the plurality of qubits comprises determining whether a neighboring qubit has a frequency group that is the same as the frequency group of the at least one qubit.

4. The method according to claim 1, wherein the determining for the at least one qubit of the plurality of qubits whether a frequency collision exists between said at least one qubit and neighboring qubits in the plurality of qubits comprises a neighboring qubit having a frequency group that is incompatible with the frequency group of the at least one qubit based on a defined set of design rules associated with the configuration of the plurality of qubits.

5. The method according to claim 1, wherein the adjusting the frequency of the at least one qubit comprises assigning a frequency group for each of the qubits.

6. The method according to claim 1, wherein prior to the adjusting the frequency of the at least one qubit, determining an amount of adjusting needed for the at least one qubit to have a resonant frequency which falls within the frequency range of the assigned frequency group.

7. The method according to claim 1, wherein the determining the plurality of frequency groups comprises maximizing a margin between a mean frequency of a range of frequencies in at least one of the plurality of frequency groups and a potentially active collision band boundary frequencies of collision bands arising in the configuration of the plurality of qubits.

8. The method according to claim 7, wherein the maximizing the margin comprises including an additional margin based on manufacturing tolerances of the quantum chip.

9. The method of claim 7, wherein the maximizing the margin comprises providing margins so as to achieve collision avoidance in the quantum chip.

10. The method according to claim 1, wherein the assigning the frequency group in the plurality of frequency groups for the plurality of qubits based on each respective qubit frequency comprises assigning a frequency group starting with a qubit having the fewest neighbors or starting with a qubit having the most frequency group choices.

11. The method according to claim 1, further comprising: increasing, by the computer system, a number of frequency groups of the plurality of frequency groups based on a determination that a defined tuning precision is needed that is higher than an existing tuning precision, and decreasing when the frequency range within each group of frequencies is made larger.

12. The method according to claim 1, wherein the determining, for each of the plurality of qubits, a qubit frequency comprises: determining for a first qubit a first qubit frequency, determining for a second qubit a second qubit frequency, and determining for a third qubit a third qubit frequency, wherein the third qubit is a control qubit provided between the first and second qubits, wherein a difference between the first and third frequencies is greater than a certain margin frequency and a difference between the second and third frequencies is greater than the certain margin frequency to substantially avoid frequency collisions.

13. The method according to claim 12, wherein a frequency in a first group of qubit frequencies is set equal to the first qubit frequency, and where a frequency in a second group of qubit frequencies is set equal to the second qubit frequency, and where a frequency in a third group of qubit frequencies is set equal to the third qubit frequency.

14. A non-transitory computer-readable medium for frequency allocation in a quantum chip having a plurality of qubits, the computer-readable medium having instructions that, when executed by a computer system, cause the computer system to:
determine, by the computer system, a plurality of frequency groups based on a configuration of the plurality of qubits, wherein each frequency group of the plurality of frequency groups has a range of frequencies;
determine, by the computer system, for each of the plurality of qubits, a qubit frequency; assign, by the computer system, a frequency group from the plurality of frequency groups to each of the plurality of qubits based on each respective qubit frequency;
determine, by the computer system, for at least one qubit of the plurality of qubits whether a frequency collision exists between said at least one qubit and neighboring qubits in the plurality of qubits based on the qubit frequency of said at least one qubit and at least one qubit frequency of the neighboring qubits; and
adjust, on the quantum chip, the frequency of each of the at least one qubit to have a frequency in the range of frequencies of the frequency group to which that qubit was assigned based on the determination that a frequency collision does not exist between said at least one qubit and neighboring qubits in the plurality of qubit.

15. The non-transitory computer-readable medium according to claim 14, wherein the computer-readable medium has instructions that, when executed by a computer system, cause the computer system to determine whether a neighboring qubit has a qubit frequency that falls within the frequency group of the at least one qubit.

16. The non-transitory computer-readable medium according to claim 14, wherein the computer-readable medium has instructions that, when executed by a computer system, cause the computer system to determine whether a neighboring qubit has a frequency group that is the same as the frequency group of the at least one qubit.

17. The non-transitory computer-readable medium according to claim 14, wherein the computer-readable medium has instructions that, when executed by a computer system, cause the computer system to adjust the frequency of the at least one qubit by assigning a frequency group for each of the qubits.

18. The non-transitory computer-readable medium according to claim 14, wherein the computer-readable medium has instructions that, when executed by a computer system, cause the computer system to assign the frequency group in the plurality of frequency groups for the plurality of qubits based on each respective qubit frequency by locally maximizing a margin between the plurality of frequency groups.

19. The non-transitory computer-readable medium according to claim 14, wherein the quantum chip includes a lattice of the plurality of qubits, wherein the lattice is one of a linear, rectangular, square, or hexagonal lattice.

20. The non-transitory computer-readable medium according to claim 14, wherein the plurality of qubits comprise a first qubit having a first qubit frequency, a second qubit having a second qubit frequency, and a third qubit having a third qubit frequency, wherein the third qubit is a control qubit provided between and connected to the first and second qubits, wherein a difference between the first and third frequencies is greater than a certain margin frequency and a difference between the second and third frequencies is greater than the certain margin frequency to substantially reduce frequency collisions.

* * * * *